United States Patent
Diorio et al.

(10) Patent No.: US 7,283,037 B2
(45) Date of Patent: Oct. 16, 2007

(54) RFID TAGS ADJUSTING TO DIFFERENT REGULATORY ENVIRONMENTS, AND RFID READERS TO SO ADJUST THEM AND METHODS

(75) Inventors: Christopher J. Diorio, Shoreline, WA (US); Kurt E. Sundstrom, Woodinville, WA (US)

(73) Assignee: Impinj, Inc., Seattle, WA (US)

( * ) Notice: Subject to any disclaimer, the term of this patent is extended or adjusted under 35 U.S.C. 154(b) by 121 days.

(21) Appl. No.: 10/985,518
(22) Filed: Nov. 10, 2004

(65) Prior Publication Data
US 2005/0099270 A1  May 12, 2005

Related U.S. Application Data

(63) Continuation-in-part of application No. 10/824,049, filed on Apr. 13, 2004, now Pat. No. 7,026,935.

(60) Provisional application No. 60/519,031, filed on Nov. 10, 2003.

(51) Int. Cl.
*H04Q 5/22* (2006.01)
(52) U.S. Cl. .............. 340/10.51; 340/10.1; 340/10.5; 340/10.52; 340/10.3; 340/825.69; 340/825.72; 340/10.34; 340/572.1; 340/572.4
(58) Field of Classification Search .......... 340/10.51, 340/10.1, 10.5, 10.52, 10.3, 825.49, 825.69, 340/825.72, 10.34, 572.1, 572.4
See application file for complete search history.

(56) References Cited

U.S. PATENT DOCUMENTS
3,938,316 A  2/1976  Morokawa et al.
(Continued)

FOREIGN PATENT DOCUMENTS
WO  WO 02/065380  8/2002
(Continued)

OTHER PUBLICATIONS

Finkenzeller, Klaus, "Fundamental Operating Principles", *RFID Handbook: Fundamentals and Applications in Contactless Smart Cards and Identification*, John Wiley & Sons, Ltd ; ISBN 0-470-84402-7,(2003),pp. 29-59.

(Continued)

*Primary Examiner*—Brian Zimmerman
*Assistant Examiner*—Vernal Brown
(74) *Attorney, Agent, or Firm*—Schwegman, Lundberg & Woessner, P.A.

(57) ABSTRACT

An RFID tag has an antenna to receive a configuration signal, and a circuit with a controller that can configure the RFID circuit responsive to the configuration signal. Configuring is such that the tag backscatters by impressing data either on the carrier frequency, or on a subcarrier in addition to the carrier signal, depending on the configuration signal. In the event of a subcarrier, the tag controller may optionally further determine a frequency of the subcarrier from the configuration signal. The tag may then be configured to backscatter differently, upon receiving a different configuration signal. A complementary reader transmits the configuration signal, thus imparting an operating parameter. The reader has an interface to receive an input indicative of a present geography, and a lookup table for determining an operating parameter based on the present geography. In one embodiment, the operating parameter is determined from regulations at that geographic location.

8 Claims, 27 Drawing Sheets

U.S. PATENT DOCUMENTS

| | | | |
|---|---|---|---|
| 4,454,483 A | 6/1984 | Baylor | |
| 5,117,756 A | 6/1992 | Goffin, II | |
| 5,565,858 A * | 10/1996 | Guthrie | 340/10.33 |
| 5,583,819 A | 12/1996 | Roesner et al. | |
| 5,649,295 A | 7/1997 | Shober et al. | |
| 5,701,127 A | 12/1997 | Sharpe | |
| 5,751,220 A * | 5/1998 | Ghaffari | 340/10.2 |
| 5,867,535 A | 2/1999 | Phillips et al. | |
| 5,912,632 A | 6/1999 | Dieska et al. | |
| 5,940,006 A | 8/1999 | MacLellan et al. | |
| 5,952,922 A | 9/1999 | Shober | |
| 6,043,748 A | 3/2000 | Touchton et al. | |
| 6,046,683 A | 4/2000 | Pidwerbetsky et al. | |
| 6,064,320 A | 5/2000 | d'Hont et al. | |
| 6,084,530 A | 7/2000 | Pidwerbetsky et al. | |
| 6,127,928 A | 10/2000 | Issacman et al. | |
| 6,243,013 B1 | 6/2001 | Duan et al. | |
| 6,259,991 B1 | 7/2001 | Nysen | |
| 6,356,161 B1 | 3/2002 | Nolan et al. | |
| 6,388,532 B1 | 5/2002 | Babcock | |
| 6,404,325 B1 | 6/2002 | Heinrich et al. | |
| 6,472,943 B1 | 10/2002 | Soong et al. | |
| 6,639,509 B1 | 10/2003 | Martinez | |
| 6,784,789 B2 | 8/2004 | Eroglu et al. | |
| 6,917,291 B2 | 7/2005 | Allen | |
| 7,026,935 B2 | 4/2006 | Diorio et al. | |
| 2002/0167405 A1 | 11/2002 | Shanks et al. | |
| 2003/0174049 A1* | 9/2003 | Beigel et al. | 340/10.42 |

FOREIGN PATENT DOCUMENTS

| | | |
|---|---|---|
| WO | WO-2005048312 A2 | 5/2005 |
| WO | WO-2005048312 A3 | 5/2005 |
| WO | WO-2005048612 A1 | 5/2005 |

OTHER PUBLICATIONS

"International Search Report, for Application No. PCT/US04/37387, date mailed Mar. 24, 2005", 18 Pages.

* cited by examiner

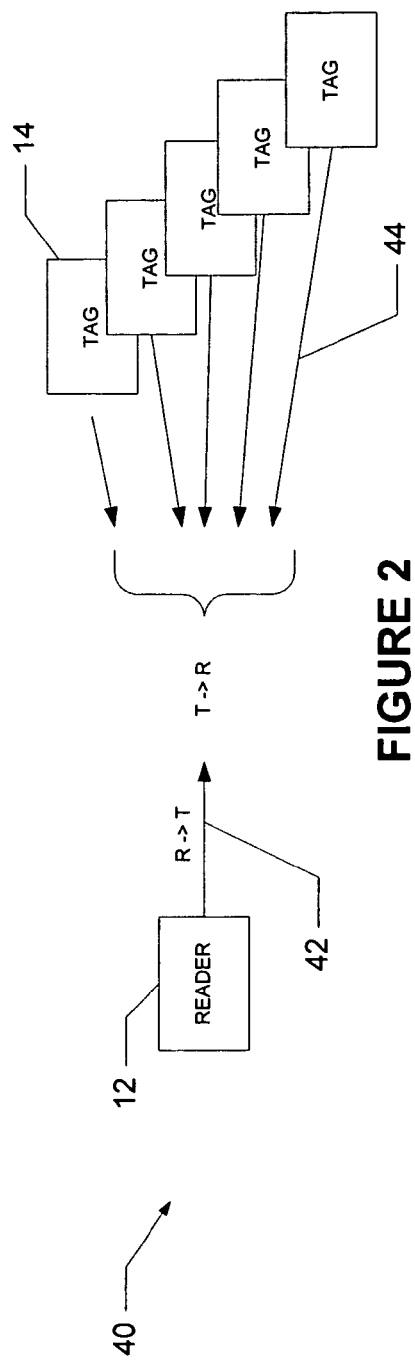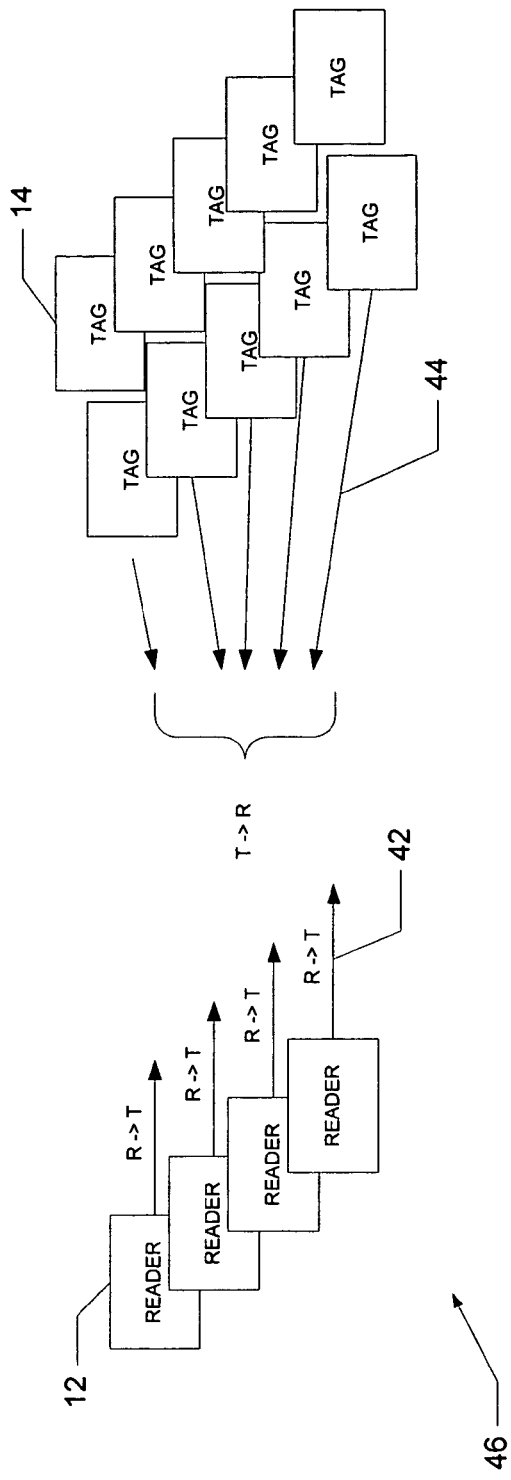

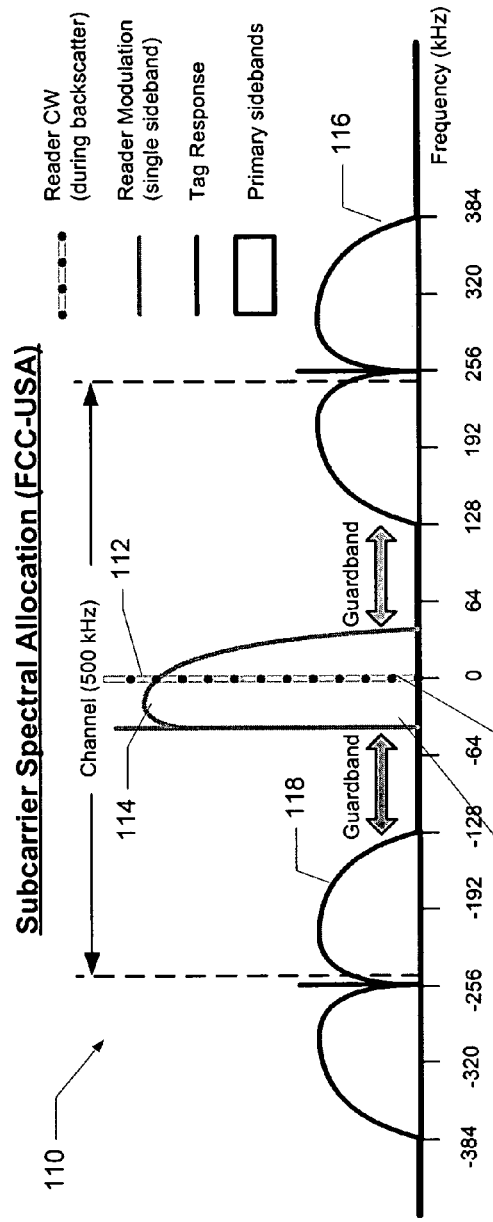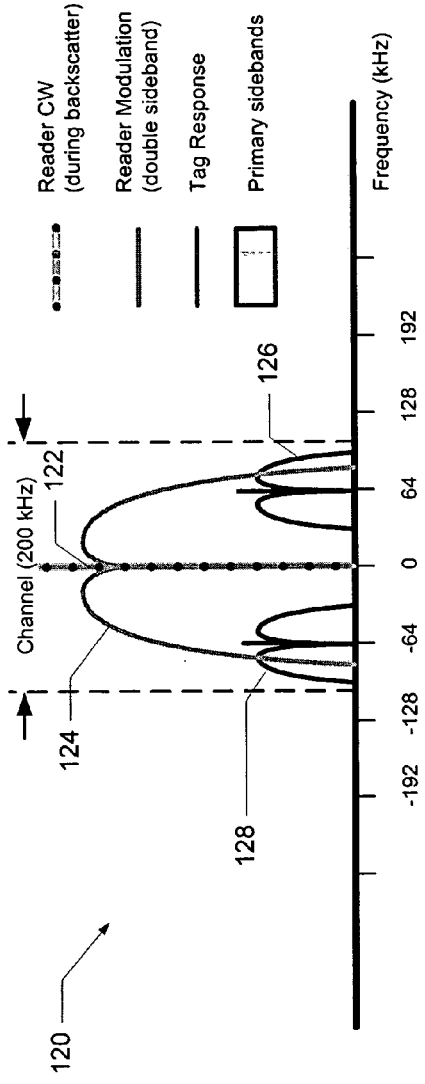

RFID TAGS ADJUSTING TO DIFFERENT REGULATORY ENVIRONMENTS, AND RFID READERS TO SO ADJUST THEM AND METHODS

RELATED APPLICATIONS

This application is a continuation-in-part of U.S. application Ser. No. 10/824,049 and claims the priority benefits of U.S. Provisional Application No. 60/519,031, filed Nov. 10, 2003, and U.S. application Ser. No. 10/824,049 filed Apr. 13, 2004, now U.S. Pat. No. 7,026,935 each of which is incorporated herein by reference.

FIELD OF THE INVENTION

An embodiment relates generally to the field of wireless communications and, more specifically, to wireless communications in a radio-frequency identification (RFID) system.

BACKGROUND OF THE INVENTION

Radio-frequency identification (RFID) systems are being increasingly deployed to track items for a wide variety of purposes and in a wide variety of environments. For example, RFID systems are increasingly being deployed within supply chains to track inventory from manufacturing through retail distribution, for example. RFID systems are also being utilized to identify and track airline baggage within airports, to identify motor vehicles at toll gates and parking structures, and to track animals and people (e.g., to track animals within an agricultural operation, and to track children at theme parks or other public venues).

RFID systems may of course be deployed in a wide variety of environments, from a factory floor to a theme park. Certain environments have proved to be more challenging for the successful deployment of an RFID system. For example, in certain environments, a number of RFID readers and RFID tags may be utilized within a close proximity, resulting in a "noisy" radio-frequency environment in which a great deal of interference between competing signals may exist. Furthermore, RF noise and interference may be introduced into a particular operating environment by other devices (e.g., cellular or mobile telephones, microwave devices, etc.). Also worth noting is that different geographic locations may be subject to different radio-frequency transmission regulations. For example, in North America, for ultra-high frequency (UHF) RFID systems, (i.e., frequency hopping RFID systems utilizing the unlicensed 900 MHz radio-frequency band), regulatory restrictions allow for 50 or more channels, each channel being up to 500 kHz wide, and require that RFID readers must hop to a new channel at least every 400 ms. Furthermore, reader synchronization is disallowed. On the other hand, in Europe only 10 channels are allowed by the proposed ETSI 302 208 standard, each of these channels being 200 kHz wide, and RFID reader synchronization is allowed.

In short, it will be appreciated that a number of technical challenges exist with respect to the wide variety of environments, and associated environmental conditions, within which RFID systems may be required to operate. U.S. Pat. No. 5,649,295 to R. Anthony Shober, entitled document "DUAL MODE MODULATED BACKSCATTER SYSTEM" describes, as indicated by the title, a dual mode backscatter system. This document, in the background section, discusses the undesirability of a "single-mode" RFID tag that is capable of operating at either long-range mode or at higher bit rate mode, rather than being capable of operating in both modes. The document then goes on to describe a tag unit of an RFID system that has the capability to operate in a "dual mode" fashion. Specifically, a tag, based on a command from an interrogator, responds to the interrogator with either a "single tone" acknowledgement (to achieve great range) or with an information signal (for greater data rates at lesser range). The RFID system is further described in this patent as having the ability to communicate using the well-known Time-Division Duplex (TDD), Half Duplex or Full Duplex techniques.

SUMMARY OF THE INVENTION

According to one embodiment, an RFID tag has an antenna to receive a configuration signal, which may have been generated by an RFID reader. The tag also has a circuit with a controller that is adapted to configure the RFID circuit responsive to the configuration signal. Configuring is such that the tag backscatters by impressing data either on the carrier frequency, or on a subcarrier in addition to the carrier signal, depending on the configuration signal. In the event of a subcarrier, the tag controller further determines a frequency of the subcarrier from the configuration signal. The tag may then be configured to backscatter differently, upon receiving a different configuration signal, and so on.

According to another embodiment, an RFID reader includes an interface to receive an input indicative of a present geography, and a lookup table for determining an operating parameter based on the present geography. In one embodiment, the operating parameter is determined from regulations at that geographic location. The RFID reader also includes a controller adapted to transmit a first configuration signal, for configuring RFID tags to operate at that operating parameter. For example, the regulatory environment may specify channels, and whether the tag may backscatter at frequencies that are wholly within a channel, straddle a boundary of it, or be wholly outside it. The configuration signal may also communicate a subcarrier frequency for use in backscattering.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2 is a diagrammatic representation of a sparsely populated RFID environment within which a single RFID reader is shown to provide a reader-to-tag transmission to a limited population of RFID tags.

FIG. 3 is a diagrammatic representation of a densely populated environment, in which multiple RFID readers communicate, via respective reader-to-tag transmissions, with a large population of RFID tags.

FIG. 13 is a frequency diagram illustrating an exemplary subcarrier spectral allocation conforming to the FCC regulatory requirements to be effective within the USA.

FIG. 14 shows a frequency diagram illustrating a subcarrier spectral allocation in terms of regulations provided by the CEPT to be effective within Europe.

DETAILED DESCRIPTION

A method and an apparatus to configure an RFID system to be adaptable to a plurality of regulatory environments are described. In the following description, for purposes of explanation, numerous specific details are set forth in order to provide a thorough understanding of the present invention. It will be evident, however, to one skilled in the art that the present invention may be practiced without these specific details.

Figure 1:
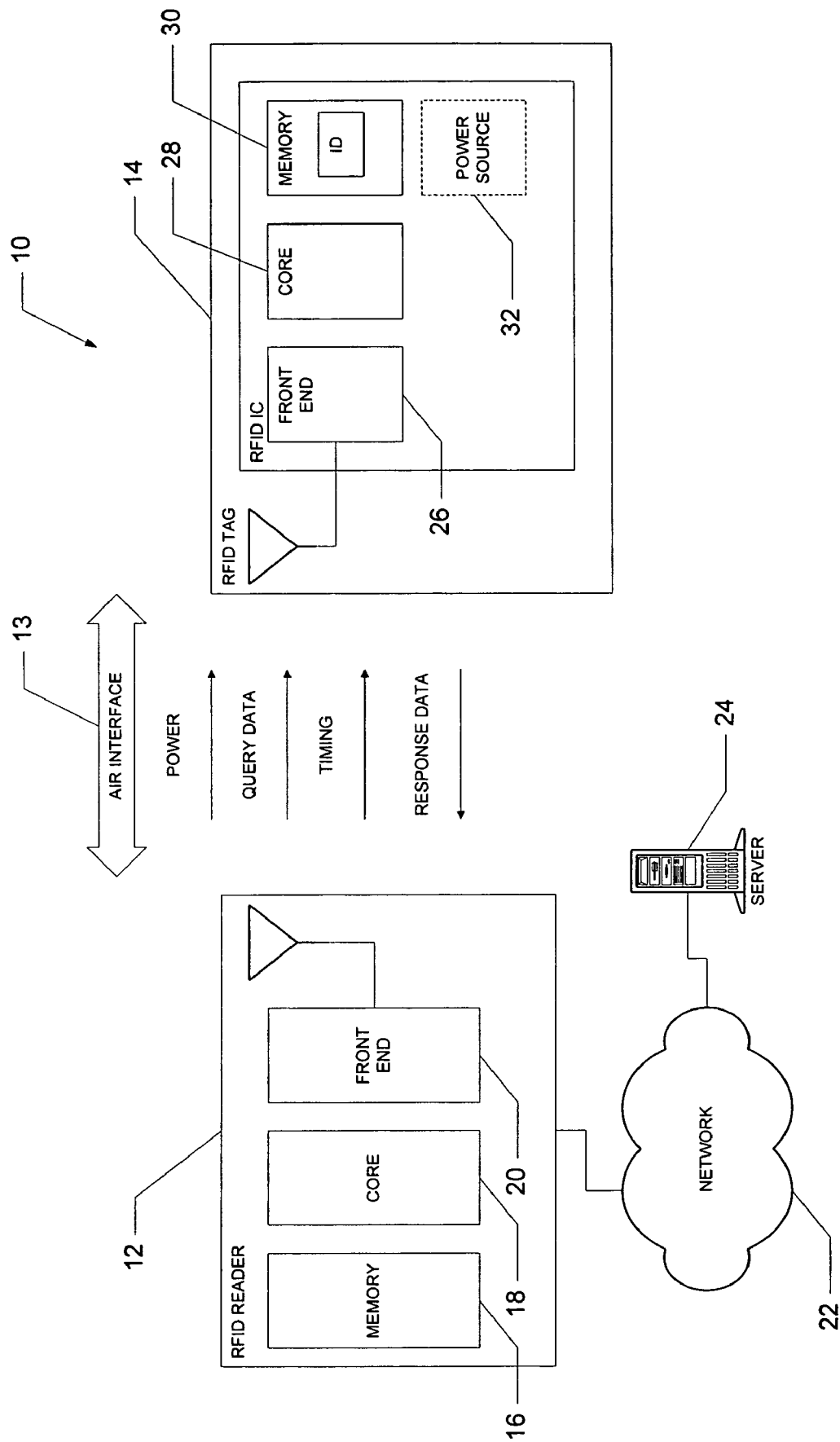
FIG. 1 is a diagrammatic representation of an exemplary RFID system, within which an embodiment of the present invention may be implemented.

FIG. 1 is a diagrammatic representation of an exemplary RFID system 10, within which an embodiment of the present invention may be implemented. The RFID system 10 includes an RFID reader 12 that transmits information, via a wireless air interface 13, to one or more RFID tags 14. The air interface 13 enables the RFID reader 12, as shown, to provide power, query data and timing information to an RFID tag 14, responsive to which the RFID tag 14 may provide response data. Specifically, the RFID tag 14 may to scavenge power from a received radio-frequency (RF) signal, and may backscatter the response data to the RFID reader 12 by modulating the impedance of an associated antenna. In a half-duplex communications embodiment, during a reader-to-tag transmission, the RFID reader 12 may modulate an RF waveform with information (e.g., bits). During a tag-to-reader transmission, the RFID reader 12 transmits a Continuous-Wave (CW) radio-frequency signal. The RFID tag 14 then backscatter-modulates the CW signal with bits, creating a radio-frequency (RF) information waveform that is transmitted back to the RFID reader 12.

Dealing now specifically with the RFID reader 12, this device is shown to include a memory 16 within which to store various algorithms and information, a core 18 (e.g., a controller or processor) that operates to control operations of the RFID reader 12, and a front end 20, coupled to an antenna, to control the transmission of information via the air interface 13 by an antenna, and also to process backscatter information received via the air interface 13 by the antenna.

In one exemplary deployment, the RFID reader 12 may be coupled (e.g., via a network 22) to a further computer system, such as a server 24. This allows for the programming and/or control of the RFID reader 12 by the server 24. Further, the RFID reader 12 can provide data, via the network 22, to the server 24 for any one of a multitude of purposes. For example, multiple RFID readers 12 may be coupled to a computer system, such as the server 24, so as to provide the server 24 with a comprehensive view of a particular environment. Consider the exemplary environment in which multiple RFID readers 12 are deployed at the various locations within a warehouse. In this deployment, each of the RFID readers 12 may be coupled via a network 22 (e.g., a wired or wireless network) to one of more servers 24, so as to provide a warehouse operator with RFID access to multiple locations within a warehouse, and/or across multiple warehouses.

The RFID tag 14 may be a combination of an RFID circuit (e.g., an RFID Integrated Circuit (IC)), and a coupled antenna (or antennae) to facilitate the reception and transmission of radio-frequency signals via the air interface 13. The RFID circuit and the antenna are typically located on a base material or substrate (e.g., a plastic or paper material) to thereby constitute the RFID tag 14. The RFID tag 14 is shown in FIG. 1 to include a number of subcomponents, any one or more of which may be implemented on one or more integrated circuits that form part of the RFID tag 14. Specifically, the RFID tag 14 is shown to include a front end 26 that includes components to facilitate the processing of radio-frequency signals received via the coupled antenna, and also to facilitate the transmission of a radio-frequency signal (e.g., a modulated backscatter signal) via the coupled antenna. A core 28 operates to control operations and states of the RFID tag 14, while a memory 30 stores, inter alia, a tag identifier, a product identifier, configuration values applicable to configuration of the RFID tag 14 and possibly one or more algorithms. As noted above, the RFID tag 14 may be a "passive" tag that scavenges power from a radio-signal received via the air interface 13. Alternatively, the RFID tag 14 may be an "active" tag and include a power source 32 to power the RFID tag 14.

The air interface 13 may facilitate both full and half duplex communications. Further, while embodiments are described herein as utilizing radio-frequency signals to communicate, it will be appreciated that other forms of wireless communication may be utilized. For example, in various embodiments, the coupling between the RFID reader 12 and the RFID tag 14 may be achieved utilizing inductive coupling, close coupling, or electrical coupling.

The behavior of reader 12 and tag 14 are now described in terms of the frequency spectra they may occupy while transmitting and modulating.

Figure 31A:
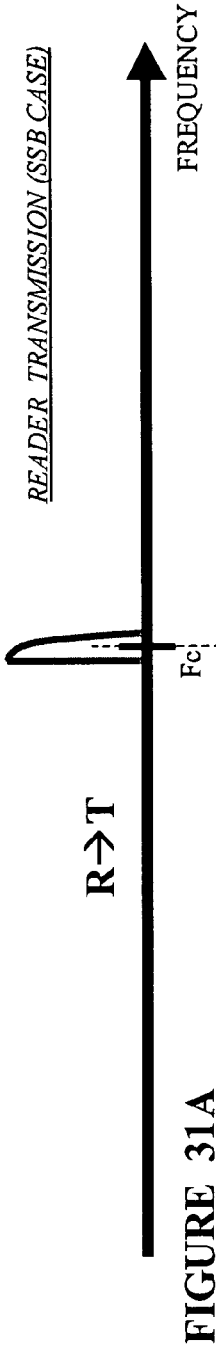
FIGS. 31A and 31B are frequency diagrams illustrating a reader behavior during transmitting and receiving, respectively.

FIG. 31A is a frequency diagram illustrating a behavior of reader 12 during transmitting. A Single Side band (SSB) scheme is employed in this example, although that is not required for practicing the invention.

Figure 31B:
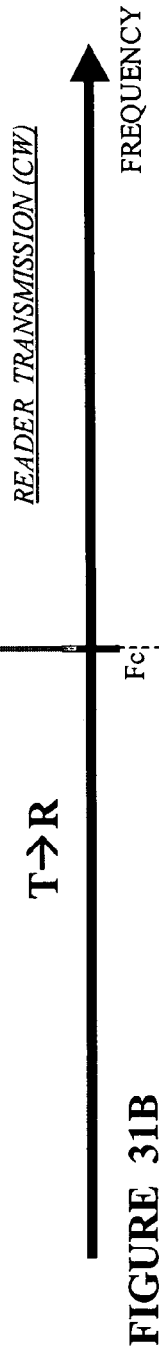

FIG. 31B is a frequency diagram illustrating a behavior of reader 12 while respectively. Reader 12 actually emits a carrier signal at a center frequency Fc. Tag 14 receives the carrier signal, and is powered by it. Reader 12 concurrently waits for backscatter by tag 10.

Figure 32A:
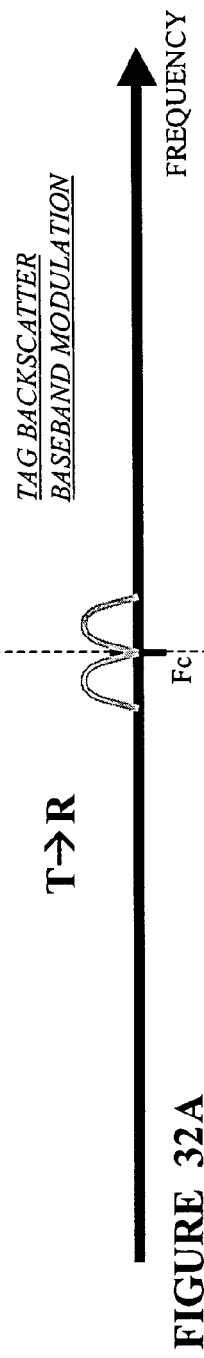
FIGS. 32A and 32B are frequency diagrams illustrating possible modulating behaviors by an RFID tag while a reader is transmitting according to FIG. 31B.

FIG. 32A is a frequency diagram illustrating a possible modulating behavior by RFID tag 14 while reader 12 is transmitting according to FIG. 31B. In a scheme called baseband modulation, tag 14 transmits by modulating only the carrier signal of FIG. 31B. This way, lobes result that are substantially collocated with carrier signal frequency Fc. While the lobes are shown as smooth, that need not be so, and different types of encoding may result in different shape of the lobes.

Figure 32B:
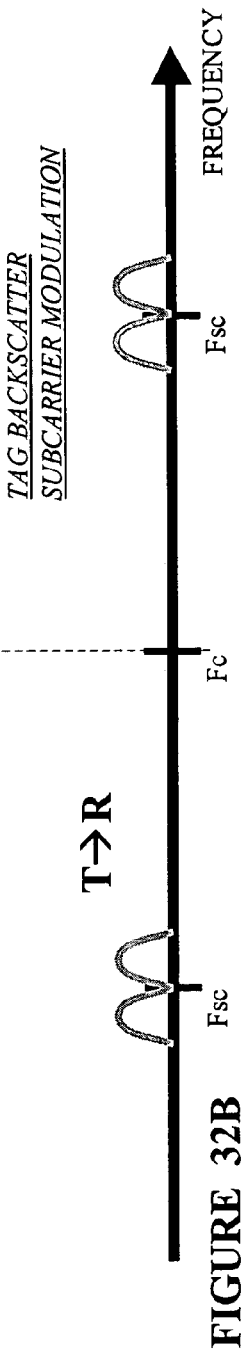

FIG. 32B is a frequency diagram illustrating possible modulating behavior by RFID tag 14 while reader 12 is transmitting according to FIG. 31B. In a scheme called subcarrier modulation, tag 14 transmits by modulating a subcarrier frequency Fsc, in addition to the carrier signal of FIG. 31B. By this it is meant that the modulated product of one is modulated by the other. This way, lobes result that are at some distance from carrier signal frequency Fc.

In addition, there are different jurisdictions at different geographic locations. These typically mandate frequency channels, and different types of uses, with different operating parameters. Possible relationships of tag backscatter spectra are now discussed with relationship to channels.

Figures 33A, 33B, 33C, 33D:
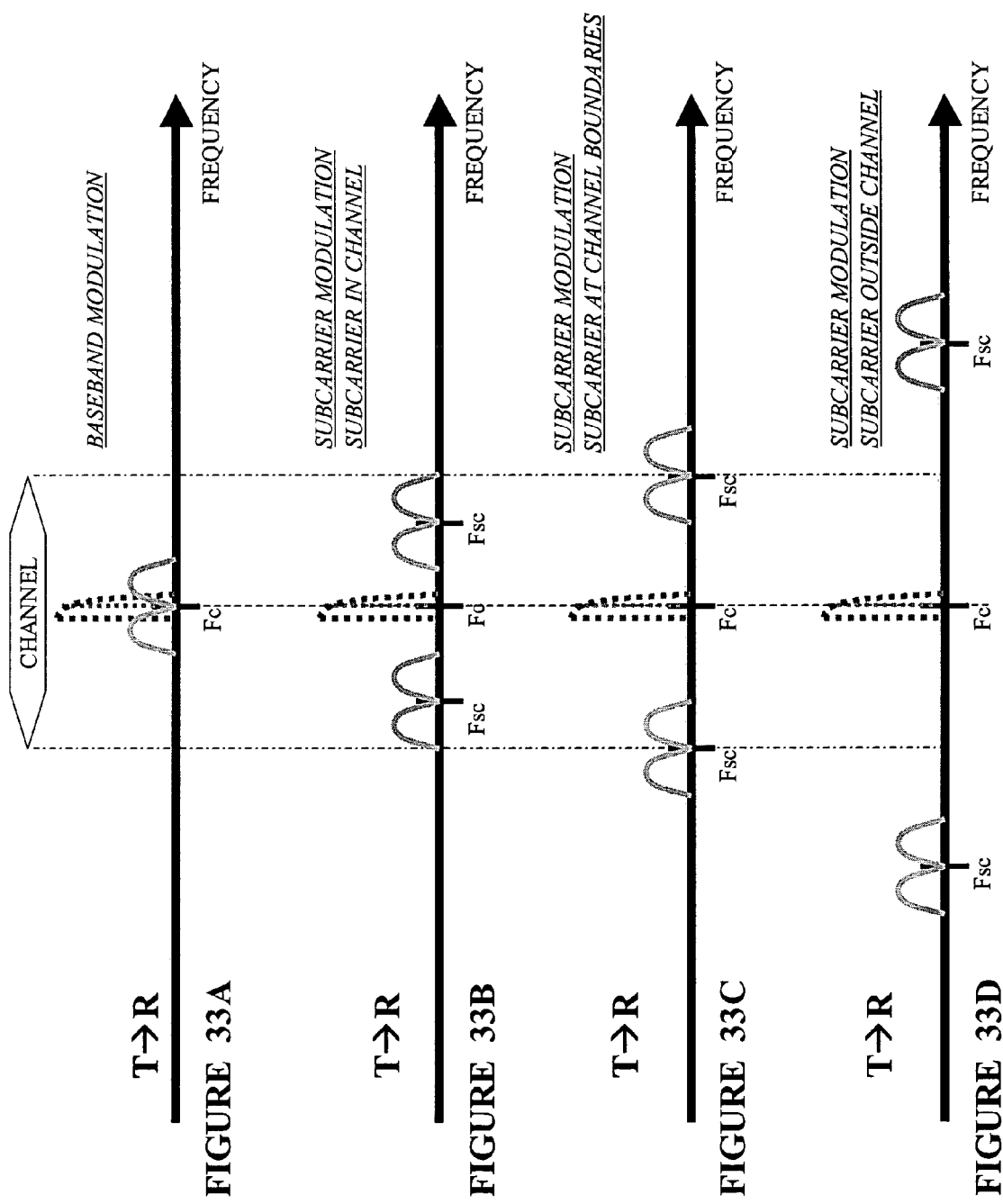
FIGS. 33A, 33B, 33C, 33D are frequency diagrams illustrating possible relationships of behaviors of RFID tags with reference to a channel imposed by regulation.

FIG. 33A is a frequency diagram illustrating that, where there is broadband modulation (as in FIG. 32A), the resulting backscatter is typically within the channel.

FIG. 33B is a frequency diagram illustrating a case of subcarrier modulation, where the lobes are wholly within the channel.

FIG. 33C is a frequency diagram illustrating a case of subcarrier modulation, where the lobes straddle a boundary of the channel.

FIG. 33D is a frequency diagram illustrating a case of subcarrier modulation, where the lobes are wholly outside the channel. In some instances, these may find themselves inside a neighboring channel.

Some of the possible options of the tags and readers of the invention are now described in more detail.

In one embodiment, an RFID tag includes at least an antenna for receiving a first configuration signal. Afterwards, a first carrier signal is received. The tag also includes a circuit coupled to the antenna. The circuit has a controller that is adapted to configure the tag to backscatter in different ways, depending on the configuration signal. One such way is to impress data on the carrier signal only. Another such way is to impress data on a frequency of a first subcarrier, in addition to the carrier signal.

Configuring may be performed by configuring a modulator of the tag that performs the backscattering. In one embodiment, configuring of the modulator includes modifying a modulator switch signal that is supplied to the modulator.

In an optional embodiment, the controller is further adapted to determine the subcarrier frequency from the configuration signal.

In an optional embodiment, the antenna is adapted to receive a second configuration signal and then a second carrier signal. Then the controller is adapted to configure the tag to backscatter by impressing data on either the second carrier signal, or a frequency of the second subcarrier in addition to the second carrier signal, depending on the second configuration signal. The controller may be further adapted to determine the second subcarrier frequency from the second configuration signal.

In this embodiments, the first configuration signal optionally and advantageously includes a configuration parameter, which can be used to determine any one or more of a bit rate, cycles per symbol, subcarrier frequency, symbol assignment and backscatter duration.

In one embodiment, an RFID reader according to the invention includes an interface to receive an input indicative of a present geography. By "present geography" it is meant in this document a geographical location.

The interface may be implemented in many ways. In one embodiment, it is a user interface, and the input is received manually by a user. In another embodiment, the interface is an a computer system, and the input is received by an operator of the computer system. In yet another embodiment, the interface is a network interface to a computer system, and the input is received via a network from the computer system. In one more embodiment, the input is a signal received from another RFID reader. Or the input can be RF interference, and the operating parameter is looked up from the RF interference. Or it may be a global positioning system (GPS) interface, and the input is a signal identifying a geographic location at which the RFID reader is operating. The reader also includes a lookup table for determining an operating parameter based on the present geography. The parameter may be any one or more of a bit rate, cycles per symbol, subcarrier frequency, symbol assignment and backscatter duration. The table may be implemented by storing data in a memory, by a state machine, and so on. In one embodiment, the operating parameter may be found from known a regulation that is enforced at the geography.

The reader also includes a controller adapted to transmit a first configuration signal for configuring RFID tags to operate at the operating parameter. The configuration signal commands the tag to operate as was described above. Optionally, it may also inform of the subcarrier frequency.

As mentioned above, an RFID reader 12 may be deployed in a wide variety of environments, certain of which may include high levels of RF noise and interference, or may be subject to certain regulatory restrictions and requirements.

FIG. 2 is a diagrammatic representation of sparsely populated RFID environment 40 in which a single RFID reader 12 provides a reader-to-tag transmission 42 to a limited population of RFID tags 14. The population of tags 14, responsive to receipt of the transmission 42, provides multiple tag-to-reader transmissions 44 back to the RFID reader 12.

FIG. 3 is a diagrammatic representation of a densely populated environment 46, in which multiple RFID readers 12 communicate, via respective reader-to-tag transmissions 42, to a larger population of RFID tags 14. Each of the RFID tags 14 in turn responds with an appropriate tag-to-reader transmission 44. In the densely populated environment 46, the RFID readers 12 will receive RF signals from the larger population of RFID tags 14, as well as from co-located RFID readers 12. Further, certain of the RFID readers 12 may, at any one time, be transmitting on the same channel as a further RFID reader (i.e., at least two RFID readers 12 may constitute co-channel readers). Thus, RF noise and interference levels in the densely populated environment 46 may be significantly higher than in the sparsely populated environment.

As a result of varying RF noise and interference conditions within varying environments (e.g., a sparsely populated environment versus a densely populated environment), it is advantageous to utilize different communication protocols in different environments to ensure the reliability of data transmissions. However, as the RF noise and interference levels increase within an environment, the choice of protocol required to ensure the reliability of communications may negatively impact throughput. For example, within the sparsely populated environment 40, it may be desirable to select a protocol for communications between the RFID reader 12 and the population of RFID tags 14 that can achieve a relatively higher throughput as a result of the lower RF noise and interference levels within the environment 40. On the other hand, in the densely populated environment 46, it may be desirable to select a protocol that insures reliable communications in a noisy environment 46, but at the cost of throughput efficiency.

One embodiment disclosed herein proposes an RFID system in which an RFID tag is configured to modulate a backscatter signal utilizing subcarrier-based signaling at a frequency that is suitable for a regulatory environment within which the RFID system is operating. Accordingly, in one embodiment, a first modulation scheme is utilized to modulate a backscatter signal within a RFID system, responsive to the identification of a first regulatory environment, and a second modulation scheme is utilized to modulate a backscatter signal responsive to identification of a second regulatory environment.

Figure 4:
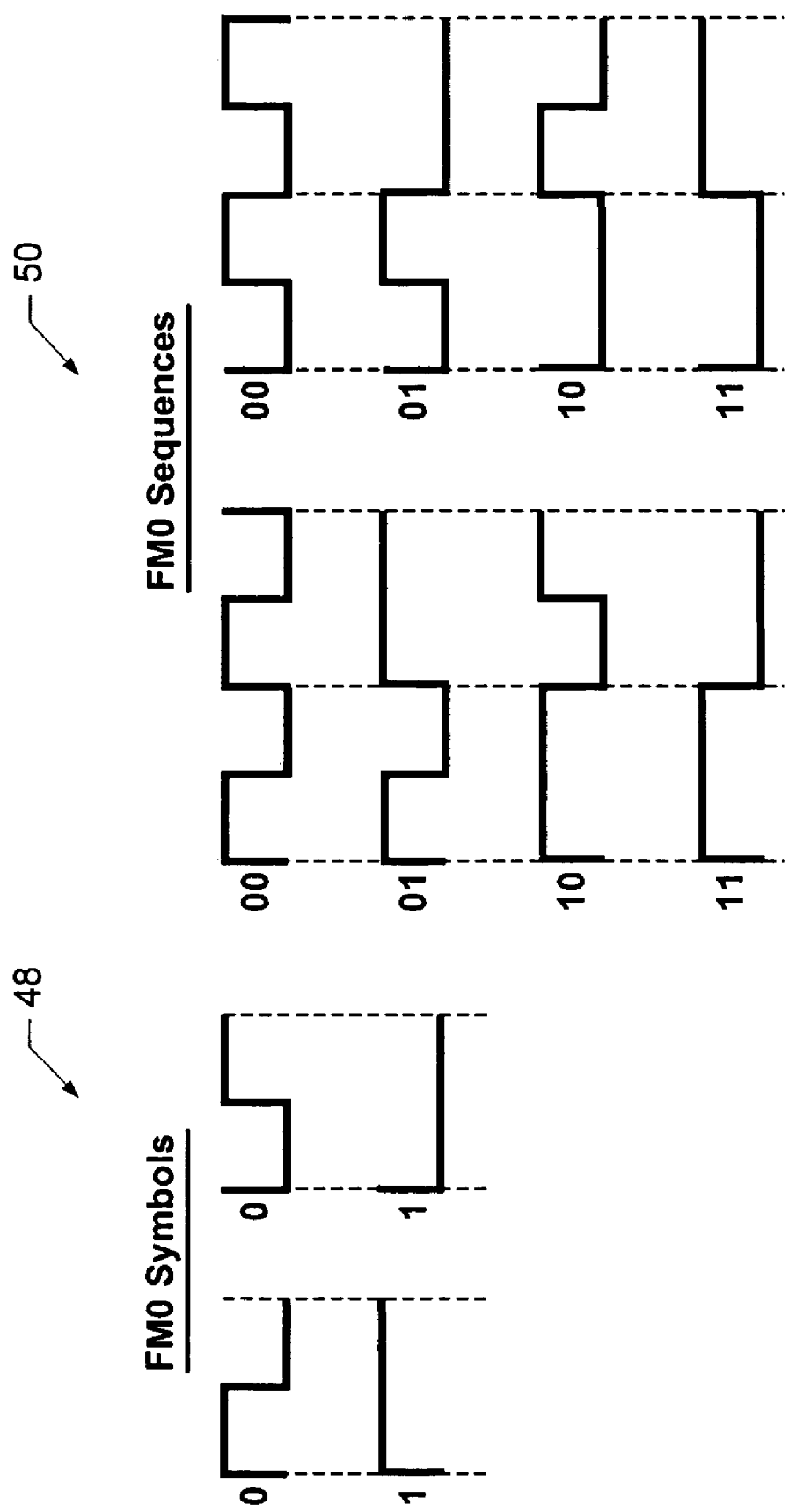
FIG. 4 illustrates two exemplary timing diagrams, depicting FM0 symbols and FM0 sequences, respectively.

Considering the example of utilizing an FMØ modulation format to modulate a backscatter signal within an RFID system, reference is made to FIG. 4 that shows exemplary timing diagrams 48 and 50 illustrating FMØ symbols and FMØ sequences respectively. FMØ-modulated backscatter is attractive in a sparsely populated environment 40, as it provides in-channel signaling and provides an increased transmission rate (e.g., bits/Hz), relative to certain other modulation formats that may be applied to a backscatter signal.

Figure 5:
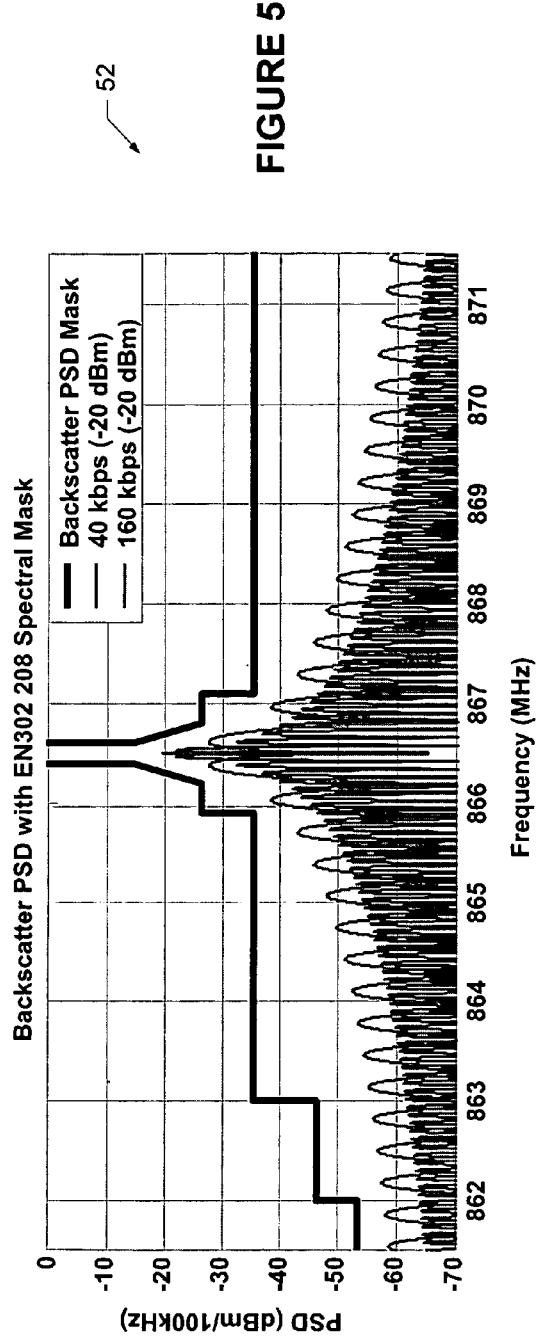
FIG. 5 illustrates a spectral density diagram, plotting Power Spectral Density against frequency for an exemplary RFID system employing an FM0 modulation format.

FIG. 5 illustrates a spectral density diagram 52, plotting Power Spectral Density (PSD) modulation against frequency (MHz) for an RFID system employing an FM0 format, and illustrates the PSD for data rates of 40 kbps and 160 kbps. This modulation format is useful in certain geographical areas, for example in Europe, in order to meet the regulatory conditions for generated RF emissions as shown in the PSD mask of FIG. 5. This modulation scheme is not required in order to meet spectral emission in North America. A reader and tag system capable of communicating using this scheme and other modulation format would have utility both in North America and Europe.

Figure 6:
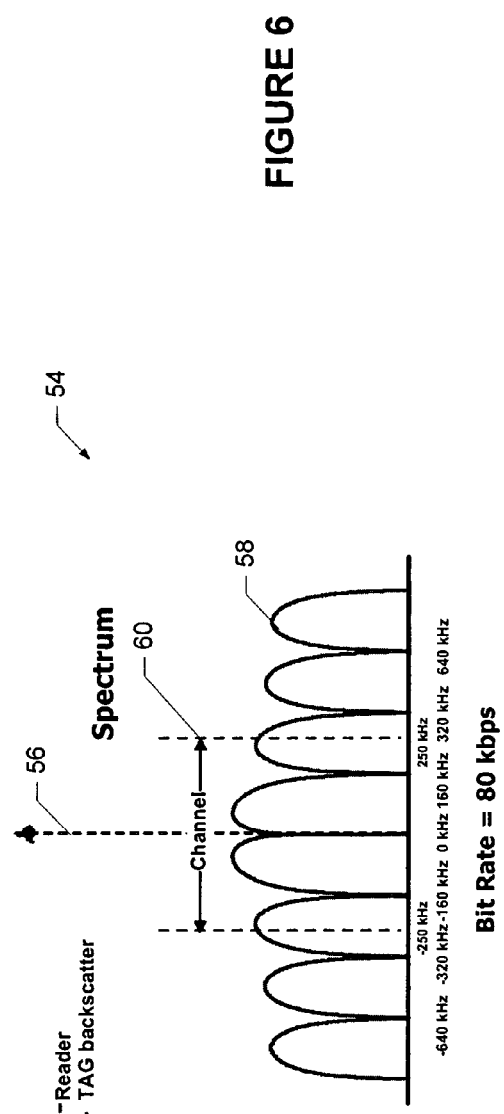
FIG. 6 is a frequency diagram illustrating various frequency signals within an exemplary RFID system employing a baseband modulation format to modulate a backscatter signal.

FIG. 6 is a frequency diagram illustrating various frequency signals within an exemplary RFID system employing baseband modulation to modulate a backscatter signal. The frequency of a forward link continuous wave (CW) signal (transmitted during tag-to-reader communications) is illustrated at 56 in broken line, and the frequencies of tag response signals are illustrated at 58 in solid line. It will be noted from FIG. 6 that the frequencies of the response signals are close to the frequency of the reader continuous wave (CW) signal 54. Accordingly, while a baseband modulation format for backscatter modulation may be useful for achieving a relatively higher throughput, interference may arise (e.g., within the channel 60 illustrated in FIG. 6), where multiple RFID readers are co-located within a particular environment. Further, as the backscatter signal frequency is close to the frequency of the reader transmission signal, interference between multiple readers and a tag population may be more acute when utilizing baseband modulation.

Figure 7:
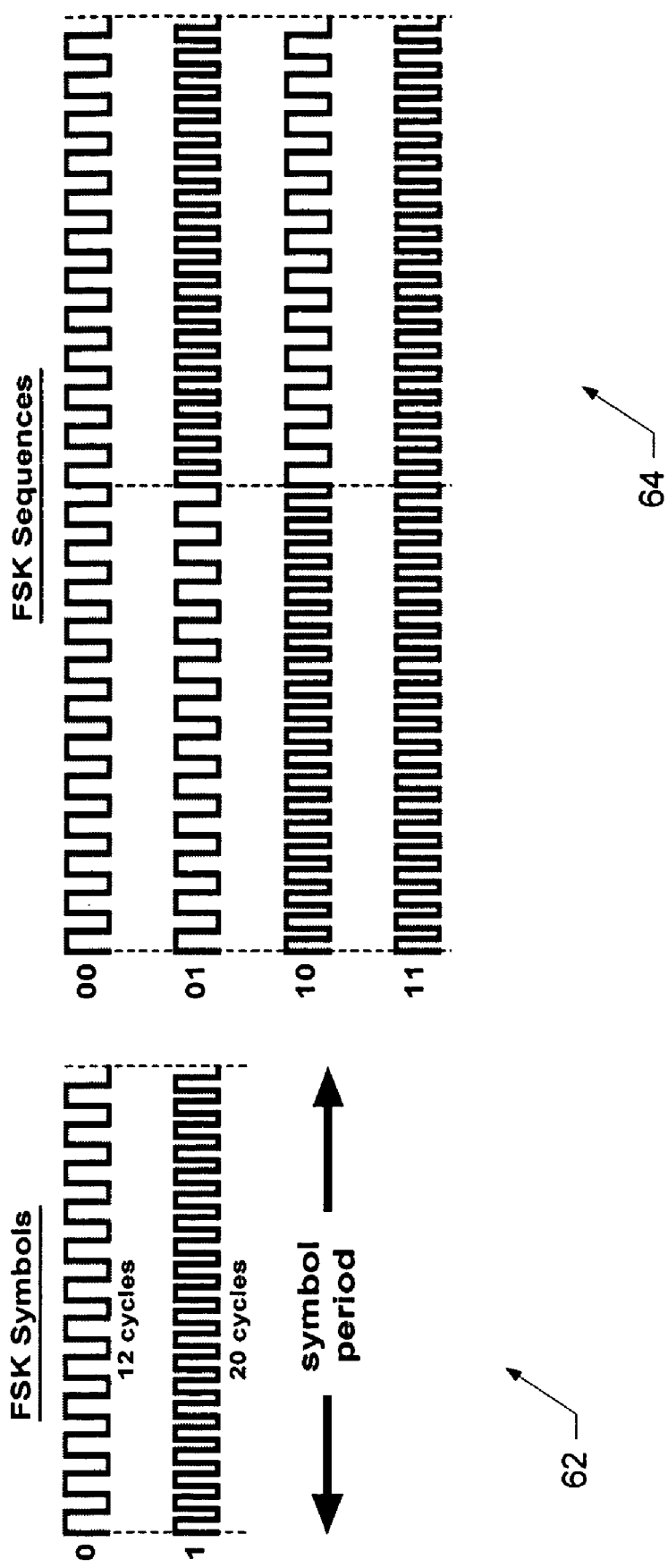
FIG. 7 shows exemplary timing diagrams illustrating FSK symbols and FSK sequences, respectively.

Having considered the use of a baseband modulation format within a sparsely populated environment, it is useful to consider how a different modulation format, such as a subcarrier modulation format (e.g., a bi-tone or a Frequency Shift Key (FSK) modulation format) may be better suited to utilization within the densely populated environment 46. To this end, FIG. 7 shows exemplary timing diagrams 62 and 64 illustrating FSK symbols and FSK sequences respectively. As an example of a subcarrier modulation format, FSK modulation utilizes two tones to represent a digital one and digital zero, respectively. Collision detection is performed by observing the relevant two tones that are utilized by the FSK modulation format. For example, where a 2.2 MHz tone is utilized to represent a digital zero and a 3.3 MHz tone is utilized to represent a digital one, the simultaneous transmission of backscatter signals utilizing these tones registers a collision. FSK-modulated backscatter is advantageous in that it facilitates increased reader sensitivity relative to FM0 modulation formats, and accordingly may be better suited to a dense reader environment.

Dealing more specifically with dense reader environments, it is, according to one embodiment, desirable to provide RFID readers that are able to be co-located, and operate in a co-channel manner, with other RFID readers in a dense RFID reader environment. Again, it should be borne in mind that different regulatory requirements may apply in different geographic regions. While North American regulations permit RFID readers to perform channel hopping, and in this way at least partially avoid certain of the issues presented by co-located readers, under European regulations, channel hopping readers is disallowed. However, European regulations do permit RFID reader synchronization.

As noted above, an issue exists with respect to baseband modulation of a backscatter signal in that the reader-to-tag, and tag-to-reader, transmissions share a common channel (e.g., the channel 60 shown in FIG. 6). As the reader-to-tag transmissions are typically of a much larger amplitude than the tag-to-reader backscatter transmissions (e.g., as much as 100 dB larger), the potential exists for a distant in-channel RFID reader to mask nearby RFID tags. For this reason, an interleaved subcarrier FSK signaling (or modulation format) provides an advantage in that RFID reader and tag transmissions utilize different frequencies. Accordingly, tag transmissions may collide with other tag transmissions, but not necessarily with reader transmissions. Similarly, reader transmissions collide with further reader transmissions, but not with tag transmissions.

Figures 8, 9:
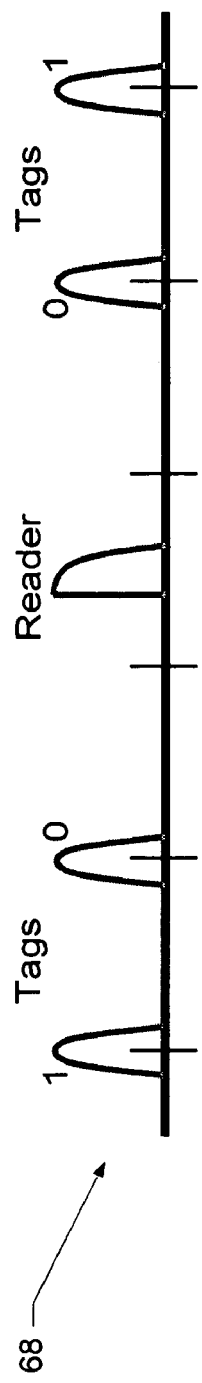
FIG. 8 illustrates a table showing transmission rates, and modulation formats, that may be utilized for forward transmissions and backscatter transmissions in U.S. and European geographic regions for FSK-modulated backscatter transmissions.
FIG. 9 is a frequency diagram, illustrating exemplary FSK spectral allocations corresponding to transmission rate and format parameters provided in the table of FIG. 8.

FIG. 8 shows a table 66 including transmission rates, and modulation formats, that could be utilized for both forward transmissions (i.e., reader-to-tag transmissions), and backscatter transmissions (i.e., tag-to-reader transmissions) under the US and European regulatory requirements for FSK-modulated backscatter transmissions. FIG. 9 is a frequency diagram 68, illustrating exemplary FSK spectral allocations corresponding to the transmission rate and format parameters provided in the table 66 of FIG. 8.

Figure 10A:
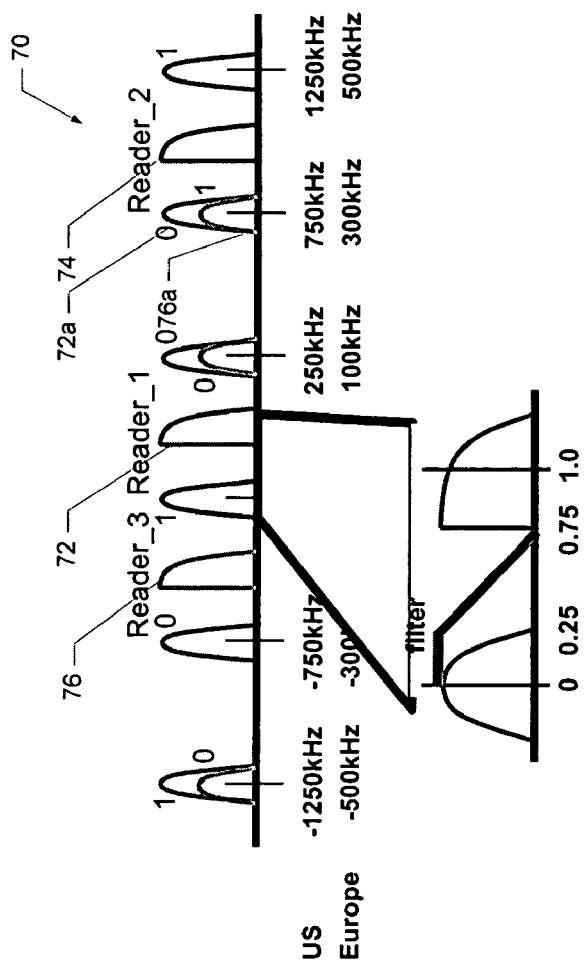
FIGS. 10A and 10B show frequency diagrams illustrating a spectral distribution within an exemplary dense reader environment, in which three co-located RFID readers perform channel hopping, and issues related to guardband sizing.

FIG. 10A is a frequency diagram 70 illustrating a spectral distribution in an exemplary dense reader environment, in which three co-located RFID readers perform channel hopping, and in which the tag population is configured to employ the FSK modulation format to modulate backscatter signals. The three co-located RFID readers 12 employ channel hopping so as to minimize reader-tag collisions. Specifically, a first RFID reader 12 transmits a reader-to-tag signal 72 in a first half channel, a second RFID reader 12 transmits a reader-to-tag signal 74 in a second half channel, and a third RFID reader 12 transmits a reader-to-tag signal 76 in a third half channel. The respective RFID readers 12 may, in the provided example, have hopped to the described channels responsive to the detection of another RFID reader 12 operating in any one of a number of channels.

As an example of something that is not allowed in the USA, the second reader, transmitting the reader-to-tag signal 74, may have initially attempted to commence transmission in the first half channel but have detected that the first reader was already transmitting the reader-to-tag signal 72 within that channel (e.g., utilizing collision detection), and accordingly have hopped to the second half channel.

FIG. 10A also illustrates a filter of the second RFID reader (Reader__2) is used to filter out offending spectrum of the first RFID reader (Reader__1).

Figure 10B:
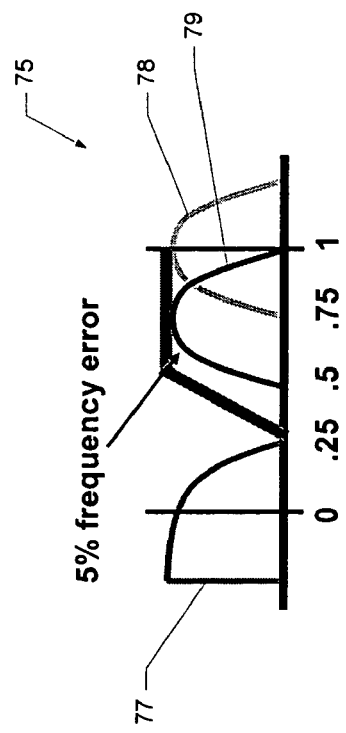

FIG. 10B is a frequency response diagram 75, and illustrates a manner in which to size guardbands between reader transmissions and tag responses. A 250 kHz of channel is normalized to 1 in the frequency response diagram 75. An interfering reader transmission spectrum is shown at 77. An actual tag response associated with the desired reader transmission is shown at 78. Due to inaccuracies in an RFID tag, the frequency of the actual RFID tag response 78 has a degree of uncertainty associated therewith. For example, the actual response frequency could be at a higher or lower the frequency than expected. A 5% frequency error of the expected tag response (78) is shown by the actual frequency response curve (79). The possible frequency error means that a much steeper filter is required than would otherwise be needed without any frequency error. Furthermore, because of the 5% frequency error, the guardband margin is reduced. This may be a significant problem because FSK requires high frequencies, and a 5% frequency accuracy on a 1250 kHz carrier (i.e., the FSK backscatter carrier frequency) consumes 62.5 kHz. Accordingly, it would be desirable to use an approach that does not require such large backscatter carrier frequencies, so that there is less negative impact to guardband margin results. In summary, guardband sizing in systems utilizing the FSK modulation format presents a number of challenges. Under the above mentioned FCC regulatory requirements, 250 kHz half-channels are required. Of the 250 kHz, 62.5 kHz of the spectrum is consumed by an interfering reader, 125 kHz is dedicated to a guardband, and 62.5 kHz of the spectrum is dedicated to backscatter communications. Accordingly, the guardband margin is at a relative minimum, in that a 5% frequency accuracy on 1250 kHz subcarrier consumes 62.5 kHz. Accordingly, the maximum link rates may be limited by the 62.5 kHz communication bandwidth.

Figure 11:
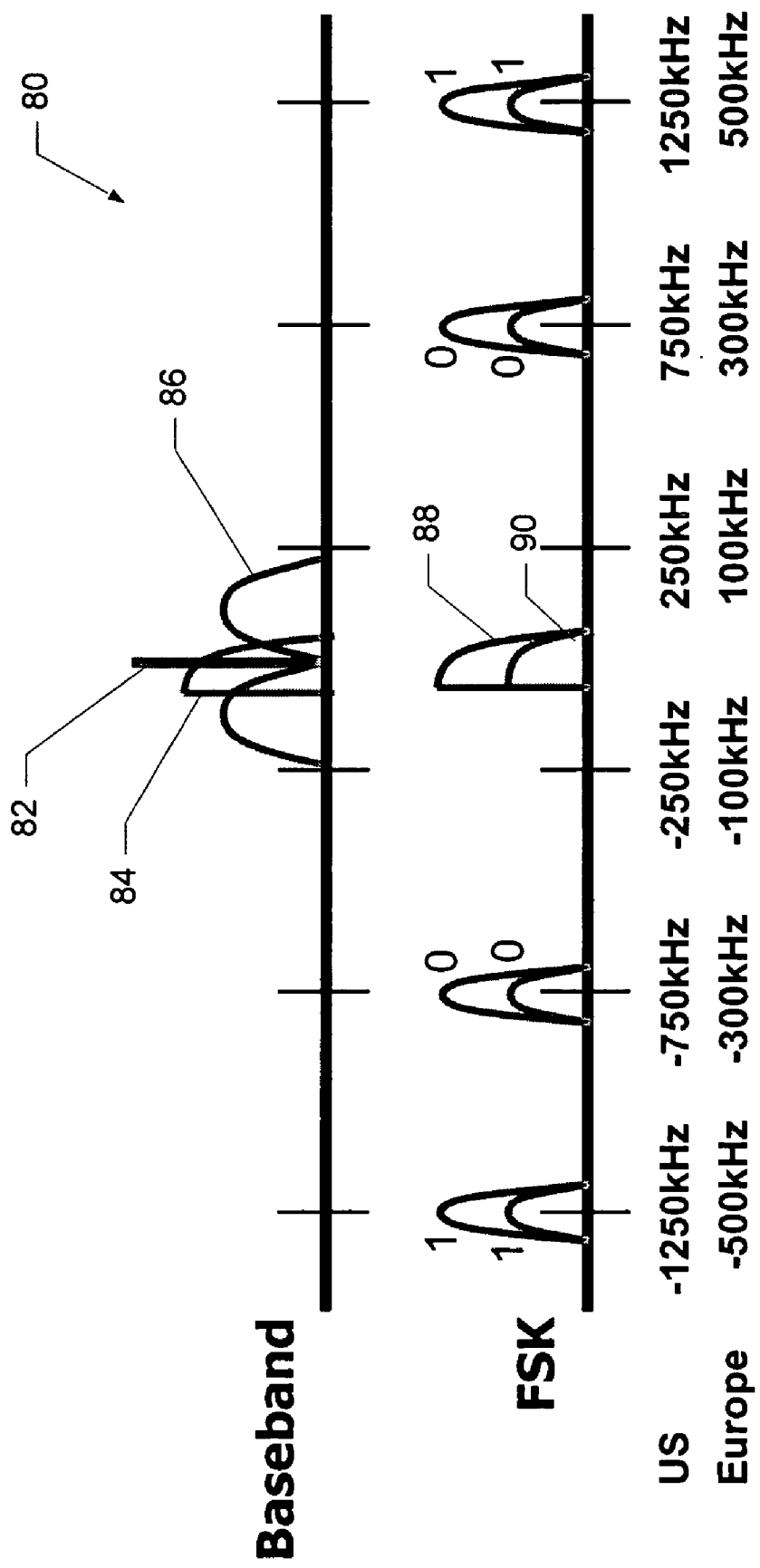
FIG. 11 includes a respective baseband and FSK frequency diagrams, illustrating a contrast between situations in which an RFID system is configured to use a baseband modulation format and a non-baseband modulation format to modulate backscatter signals from a population of RFID tags.

FIG. 11 shows respective baseband and FSK frequency diagrams 80, illustrating the contrast between situations in which an RFID system is configured to use a baseband modulation format and a non-baseband (e.g., a FSK) modulation format to modulate backscatter signals from a population of RFID tags 14. Dealing first with the frequency diagram for the baseband modulation format scenario, a particular RFID reader 12 is shown to transmit a CW signal 82, which collides with the reader-to-tag signal 84 transmitted by a further co-channel RFID reader 12. A backscatter signal 86 is shown to be modulated utilizing a baseband modulation format. Accordingly, RFID reader and tag transmissions 84 and 86 are shown to collide.

The FSK frequency diagram serves to illustrate that baseband signaling does not lend itself to co-channel readers (particularly in a dense reader environment), whereas FSK signaling better accommodates co-channel readers in a dense reader environment. The baseband frequency diagram illustrates that reader and tag transmissions collide where baseband signaling is utilized by co-channel readers. On the other hand, where FSK signaling is utilized, reader transmissions collide with other reader transmissions, and tag transmissions collide with other tag transmissions, but not vice versa.

Figure 12A:
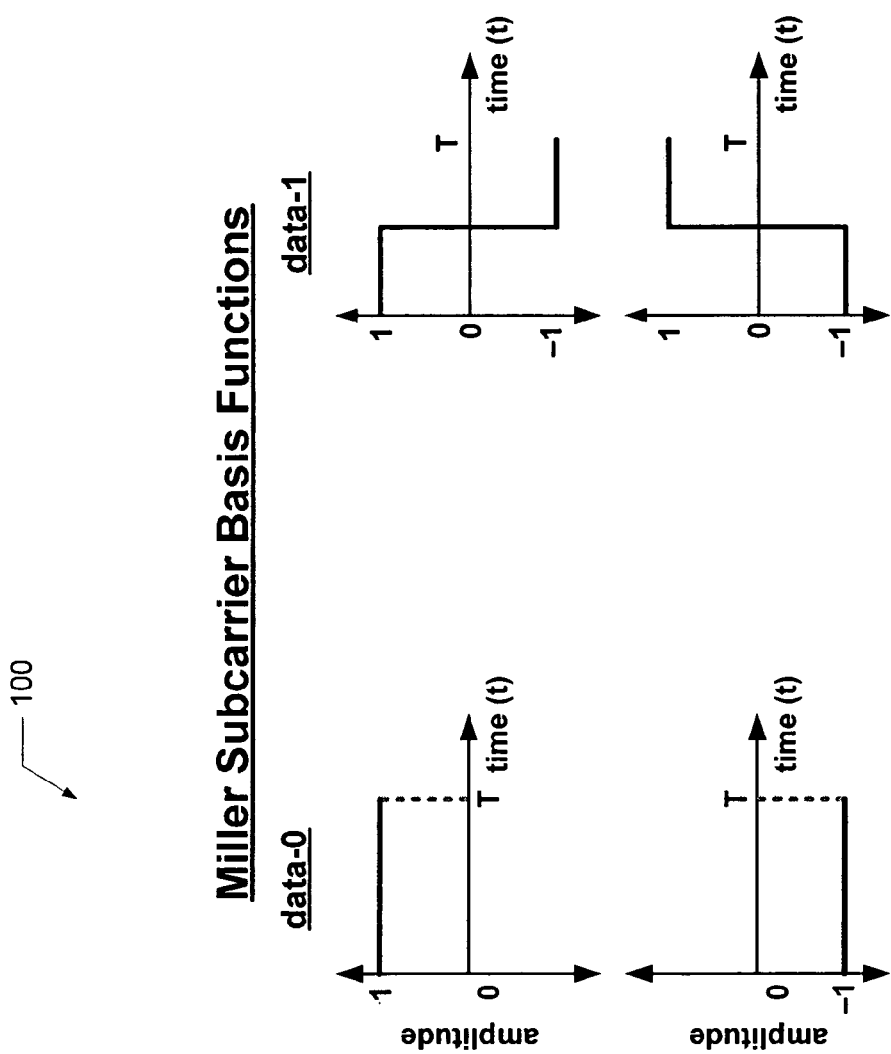
FIGS. 12A and 12B illustrate exemplary timing diagrams for subcarrier symbols and subcarrier sequences, respectively.

FIG. 12A illustrates an exemplary timing diagram 100 for subcarrier symbols, also known as Miller subcarrier basis functions. Subcarrier modulation (e.g., Miller data modulation) may be utilized to modulate a single subcarrier. Subcarrier modulation allows for increased RFID reader sensitivity, and accordingly is useful for deployment in a dense RFID environment.

Figure 12B:
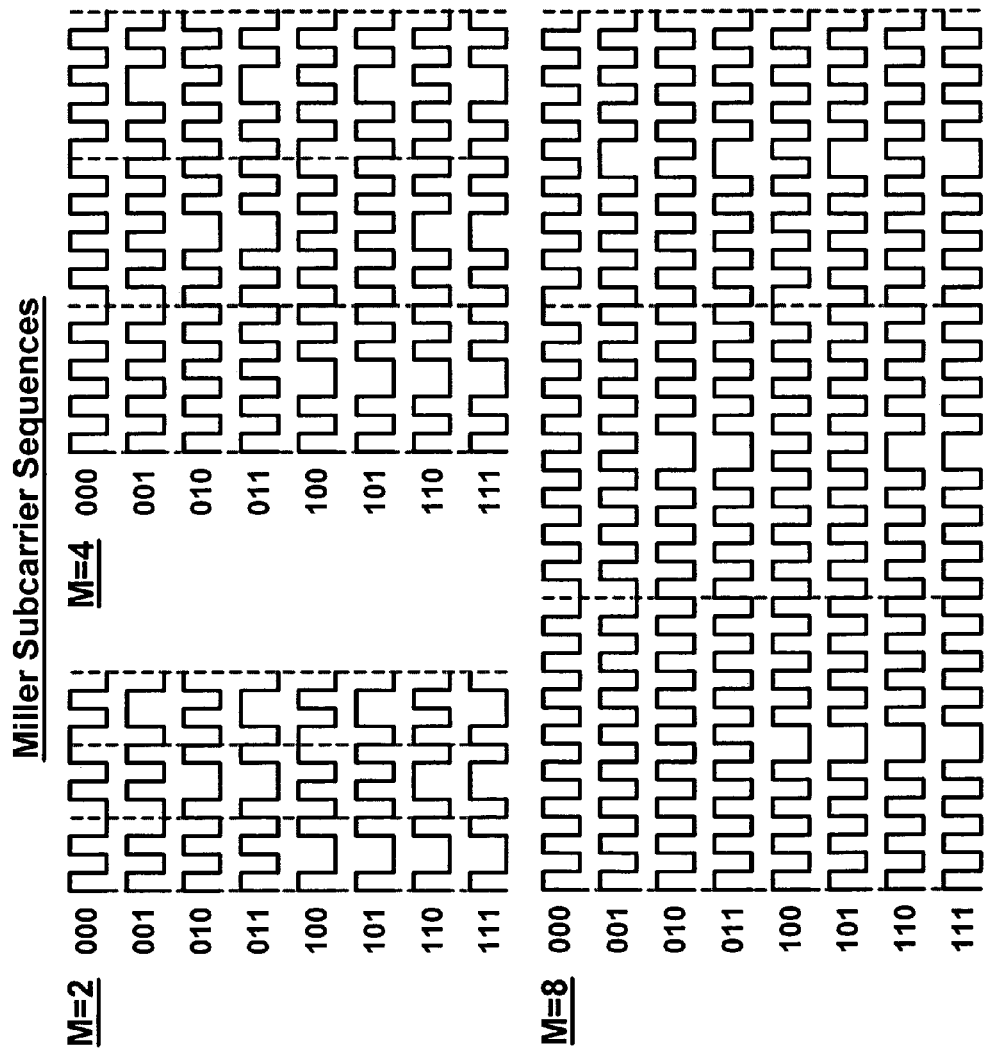

FIG. 12B illustrates an exemplary timing diagram 102 for subcarrier sequences. M is the number of subcarrier cycles per bit. Subcarrier modulation (e.g., Manchester data modulation) may be utilized to modulate a single subcarrier. Subcarrier modulation allows for increased RFID reader sensitivity, and accordingly is useful for deployment in a dense RFID environment.

FIG. 13 is a frequency diagram 110 illustrating an exemplary subcarrier spectral allocation that conforms to the Federal Communications Commission (FCC) regulatory requirements, and shows a CW signal 112 transmitted during tag-to-reader communications. A single sideband reader modulation is shown at 114, with tag responses being shown at 116 and 118 respectively. The forward-link transmissions (e.g., reader-to-tag transmission) may be transmitted at a 40 kbps rate utilizing, for example, Manchester format modulation. Backscatter transmissions may be transmitted utilizing a 64 kbps data rate at a 256 kHz subcarrier modulation format. It will be noted that the tag responses 116 and 118 constitute examples of channel-boundary backscatter signals, and straddle the boundaries of the 500 kHz channel defined in terms of FCC regulations. Current FCC regulations permit tag responses (e.g., backscatter signaling) out-of-channel, as illustrated in FIG. 13.

The FCC-permitted subcarrier spectral allocation illustrated in FIG. 13 should be contrasted with the spectral allocation illustrated in FIG. 14, which shows a frequency diagram 120 illustrating a subcarrier spectral allocation in compliance with regulations provided by the CEPT to be effective within Europe. A CW transmission 122, during tag-to-reader transmission, and a double-sideband reader modulated transmission 124, during reader-to-tag transmission, are each shown. Also shown are tag responses 126 and 128. The tag responses 126 and 128 fall within a 200 kHz channel, in compliance with the CEPT regulations that disallow out-of-channel backscatter signaling. The reader-to-tag transmissions may be at a 40 kbps data rate, and utilize, for example, the Manchester modulation format to generate the transmission signal 124. The backscatter signals (i.e., the tag responses 126 and 128) may be at a 16 kbps data rate, and utilize a 64 kHz subcarrier modulation format.

It is now useful to consider how the above-described regulatory requirements in different geographic regions (e.g., the US and Europe) impact signaling within an RFID system. Firstly, in Europe, the CEPT regulations allow for synchronization between RFID readers 12. Accordingly, for co-located readers, synchronization can be utilized to avoid reader-on-tag collisions. There is further no tag-on-tag collision since all signaling is in-channel.

Figure 15:
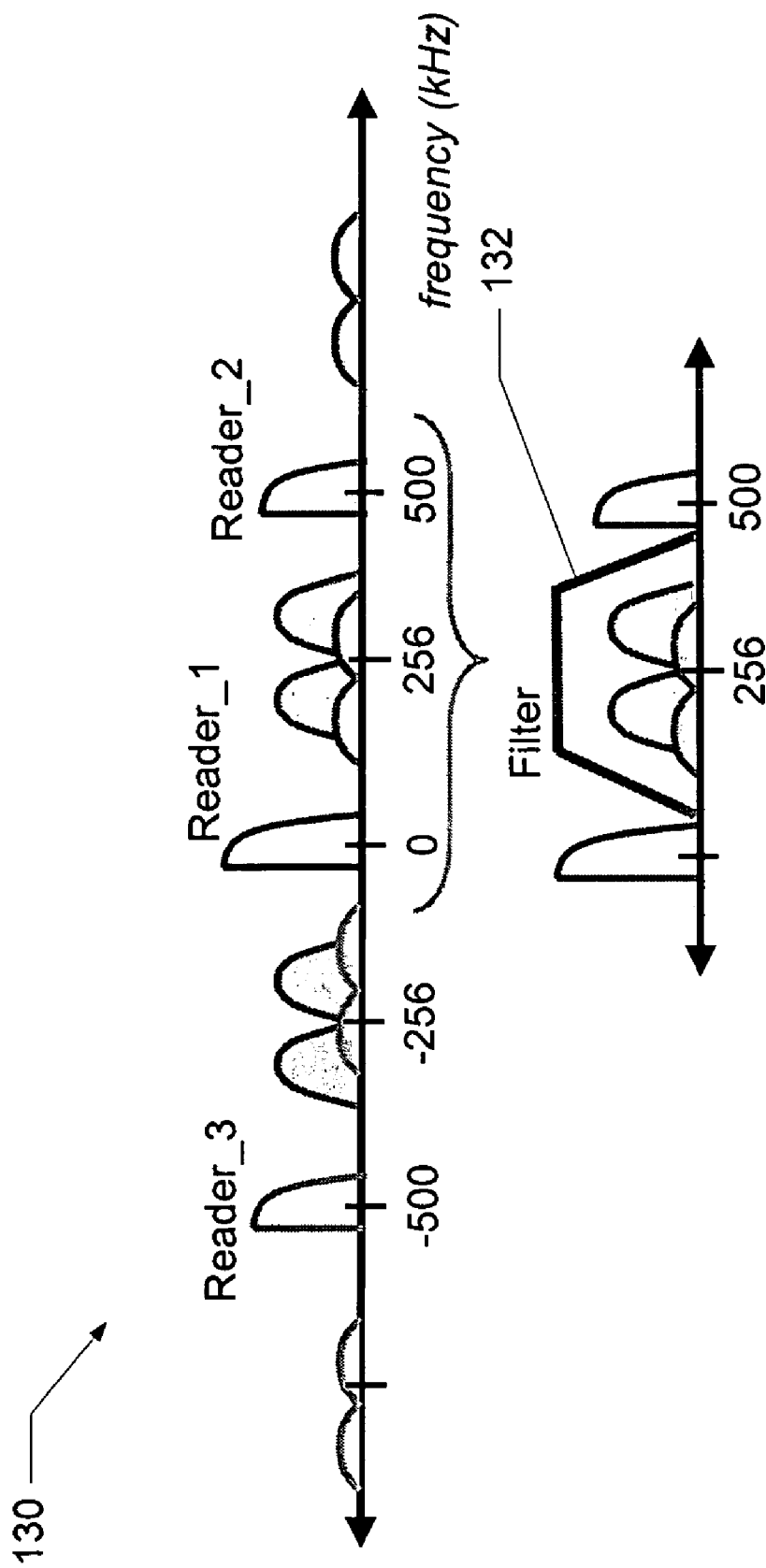
FIG. 15 shows a frequency diagram that provides an illustration of how subcarrier format modulation of backscatter signals may be utilized to reduce reader-on-tag collisions within a North American environment, in which channel-hopping is permitted.

In geographic regions in which the FCC regulations apply for co-located RFID readers 12, the utilization of subcarrier modulation formats to modulate backscatter signals reduces reader-on-tag collisions. Further, path losses minimize the impact of tag-on-tag collisions. FIG. 15 shows a frequency diagram 130 that provides an illustration of how subcarrier format modulation of backscatter signals may be utilized to reduce reader-on-tag collisions within a North American environment in which channel-hopping is permitted. FIG. 15 also illustrates how a filter 132 may be utilized to filter out half-channel transmissions from co-located RFID readers 12.

Figure 16:
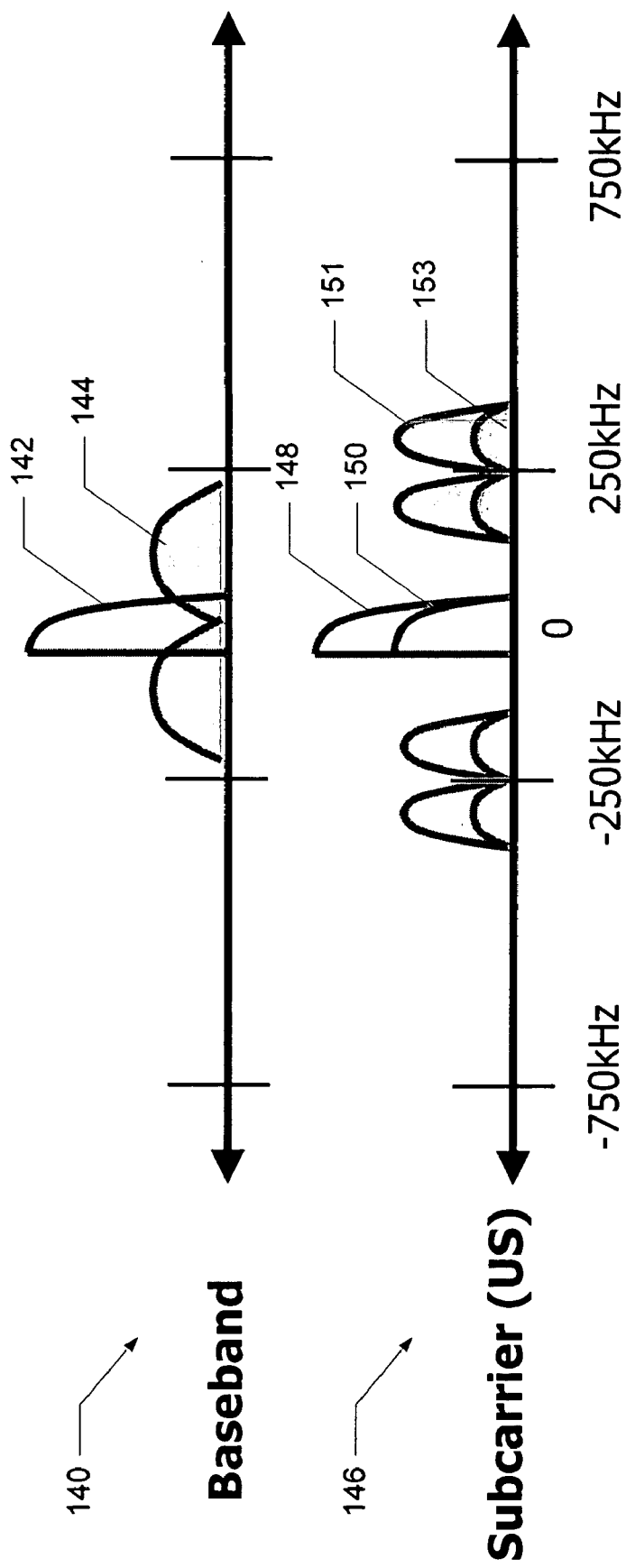
FIG. 16 shows first and second frequency diagrams, the first frequency diagram illustrating a spectral allocation within a low-density environment, and the second frequency diagram illustrating a spectral allocation in a dense-reader RFID environment in which at least two, co-channel RFID readers are deployed.

Having above described the situation with co-located readers, co-channel RFID reader scenarios are now described with reference to FIG. 16. A first frequency diagram 140 illustrates a spectral allocation within a low-density environment, in which only a single RFID reader 12 is deployed, and shows a RFID reader transmission 142 as well as tag responses (e.g., backscatter signals) modulated utilizing a baseband modulation format. A second frequency diagram 146 illustrates a spectral allocation in a dense-reader RFID environment in which at least two, co-channel RFID readers are deployed. As shown, the reader transmission signals 148 and 150 collide, as do the tag responses 151 and 153 (e.g., backscatter signals) that are modulated utilizing a subcarrier modulation format. However, it will be noted that reader-on-tag collisions are avoided (e.g., reader transmissions collide with further reader transmissions but not with tag transmissions). Furthermore, path losses reduce the impact of the reader-on-reader collisions (e.g., the collision between the transmission signals 148 and 150). Accordingly, baseband signal, as described above with reference to the frequency diagram 140, is undesirable for RFID environments employing co-channel readers, whereas subcarrier signaling, as illustrated with respect to frequency diagram 146, facilitates the deployment of co-channel RFID readers within a RFID environment.

The above discussion with respect to FIGS. 4-16 illustrates the advantages of utilizing different signal schemes (e.g., modulation formats) in different environments (e.g., low-density versus high-density environments, environments having different regulatory requirements, etc.). Accordingly, an exemplary embodiment of an RFID system includes "multi-mode" RFID tags 14 (e.g., RFID tags 14 that are able to support a number of signaling schemes), and RFID readers 12 that are able to choose and/or specify different signaling schemes. Specifically, an embodiment of an RFID reader 12 is described below that is capable of choosing and/or implementing a signaling scheme that seeks to maximize data rate and throughput in environments that permit such data rates and throughputs, without unacceptably degrading the quality of transmissions, and that is capable of choosing and/or implementing a signaling scheme that seeks to achieve a minimum transmission quality level in environments where an increased data rate (or throughput) is not possible (e.g., in a noisy environment). One advantage of implementing non-baseband (e.g., subcarrier) signaling for high-density environments is that, within such high-density environments, RFID readers 12 may or may not be synchronized, depending on regulatory requirements in a specific region. Further, the utilization of non-baseband (e.g. subcarrier) signaling for high-density environments facilitates the implementation of spectral spacing between the transmissions of RFID readers and RFID tags that allows many reader-to-tag and tag-to-reader signals to co-exist. One further advantage of the utilization of non-baseband (e.g. subcarrier) signaling for high-density environments is that collision detection that may be provided.

Figure 17:
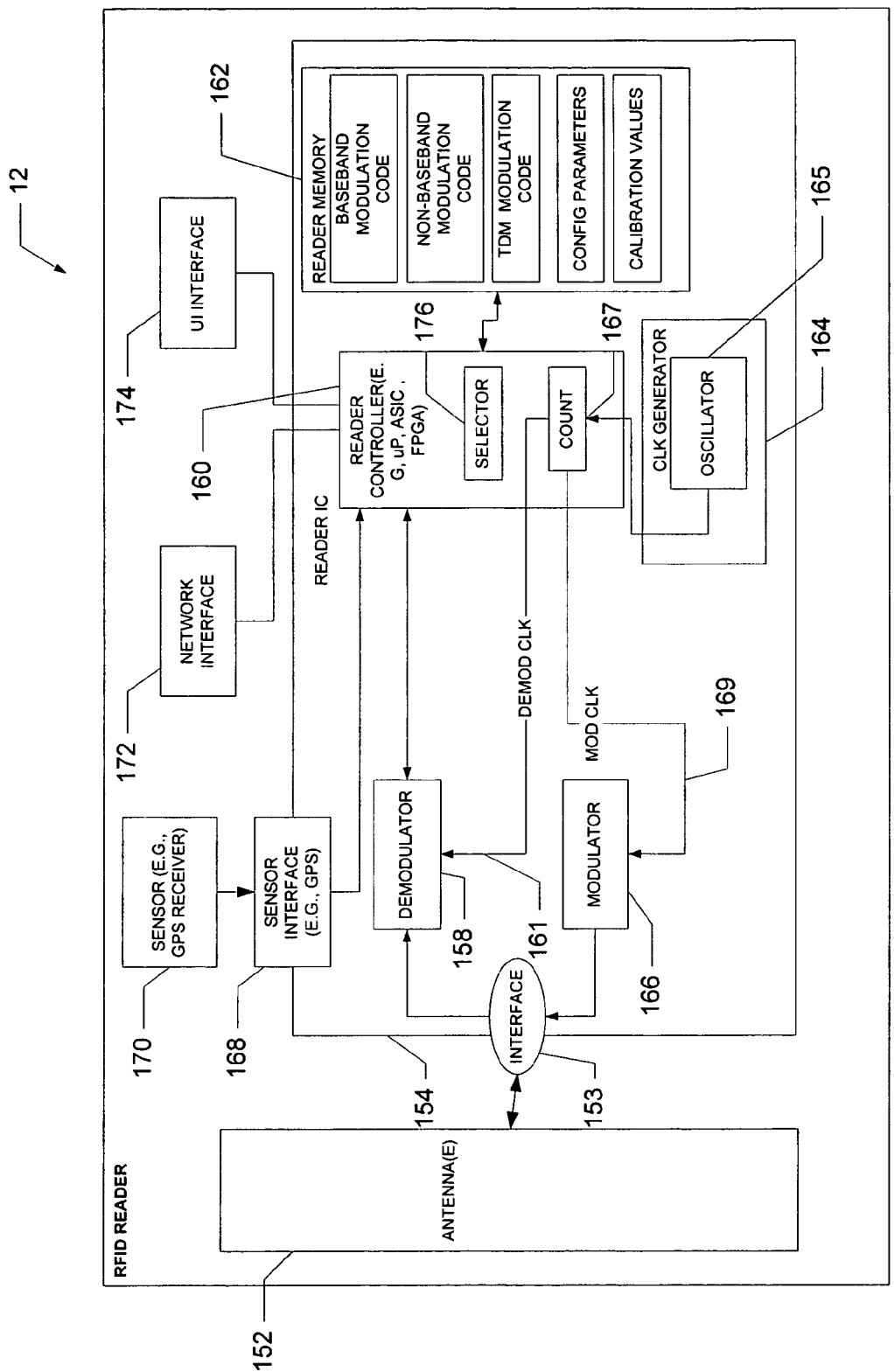
FIG. 17 is a block diagram providing further architectural detail pertaining to an RFID reader, according to one exemplary embodiment.

FIG. 17 is a block diagram providing further architectural detail pertaining to an RFID reader 12, according to one exemplary embodiment. The RFID reader 12 includes one or more interfaces to receive input (e.g., indicating at least one of a number of environmental regulations pertaining to an environment in which the RFID reader 12 is to operate), and a controller 160 to configure modulation parameters, based on the received input, thereby to configure the RFID reader 12. The interfaces are coupled a number of input sources (e.g., an antennae interface 153 is coupled to one or more antennae 152) that provide an input signal (e.g., corresponding to a received radio-frequency signal) to a reader circuit 154, which may be implemented by an integrated circuit IC. The RFID reader 12 is shown to also include a sensor interface 168 to receive input from one or more sensors 170 that may be included within the RFID reader 12 or alternatively may be external to the RFID reader 12, but be coupled (e.g., via a wired or wireless link) to the sensor interface 168. In one embodiment, the sensor 170 may be a GPS device that provides location information, identifying a present location of the RFID reader 12, via the sensor interface 168 to the reader integrated circuit 154.

The RFID reader 12 may also include a network interface 172 to enable the RFID reader 12 to be coupled (e.g., utilizing a wired or wireless link) to one or more computer systems that communicate with the RFID reader 12 for a number of purposes. For example, a computer system coupled by the network interface 172 to the RFID reader 12 may provide operational data (e.g., configuration parameters) to the RFID reader 12, and also receive information (e.g., tag population count and identification information) from the RFID reader 12.

A user interface 174 further allows a human operator to provide input to, and receive output from, the RFID reader 12. For example, a human operator may need to configure the RFID reader 12 according to conditions and regulations applicable to a particular deployment environment. The user interface 174 may also be utilized to communicate information (e.g., tag population counts and identification information) to a human operator of the RFID reader 12. To this end, the user interface 174 may be coupled to a display (e.g., an LCD or the like) or audio device to facilitate the presentation of information to a human operator.

Turning now specifically to the reader circuit 154, signals received via the antennae interface 153 (e.g., a pad) are provided to a demodulator 158 that demodulates the received input signal, and provides digital information to a reader controller 160 (e.g., a microprocessor, Application Specific Integrated Circuited (ASIC), a Floating Point Gate Array (FPGA) circuit, etc.). The digital information provided by the demodulator 158 to the controller 160 may include a response identifier, as well as response information returned to the RFID reader 12 from any one of a number of RFID tags 14 included within an interrogated population. For example, the response data may include a product identifier (e.g., an Electronic Product Code (EPC)) stored within an interrogated RFID tag 14.

FIG. 17 also illustrates that a reader memory 162 is coupled to the controller 160 and stores one or more code modules that may be retrieved by the controller 160 for execution, so as to enable the controller 160 to control operation of the RFID reader 12. For example, the reader memory 162 may store baseband, non-baseband, and Time Division Multiplex (TDM) modulation code modules (or at least modulation values) so as to appropriately configure the controller 160. For example, the various stored modulation code modules may be executed so as to enable the controller 160 to output an appropriate switch signal (e.g., a demodulator clock signal 161) to the demodulator 158.

In one embodiment, a subcarrier modulation code module, stored within the reader memory 162, may configure the controller 160 to output an appropriate demodulator clock signal 161 so as to enable the RFID reader 12 to receive backscatter radio-frequency signals, from a population of RFID tags, which are modulated utilizing subcarrier-based signaling. Further, in one embodiment, the subcarrier modulation code module may enable receipt of a backscatter signal at either of a first backscatter frequency that provides an in-channel backscatter signal for a first bandwidth channel, and a second backscatter frequency that provides a channel-boundary backscatter signal for a second bandwidth channel.

The reader circuit 154 may also include a clock generation circuitry 164, which includes an oscillator (DCO) 165. In one embodiment, the oscillator 165 may be calibrated utilizing one or more oscillation values stored within the reader memory 162. The oscillator 165 outputs a frequency signal to the controller 160 that employs a count function (or circuit) 167 to generate one or more clock signals (e.g., the demodulator clock signal 161 and a modulator clock signal 169).

The controller 160 is also shown to be coupled to a modulator 166, so as to facilitate the provision of the modulator clock signal 169.

Operation of the RFID reader 12 includes the generation of one or more commands, and associated data and configuration values, for inclusion within a reader-to-tag transmission. An issued command may be a query command to elicit certain information from a population of interrogated RFID tags 14. Further, the query command may include one or more configuration parameters (e.g., to configure an interrogated RFID tag 14 to respond utilizing one of a number of modulation schemes or formats). The controller 160 is also shown to include a selector 176 that operationally may select a modulation scheme or format for reader-to-tag transmissions, and for tag-to-reader transmissions, based on one or more inputs, potentially indicative of environmental conditions (e.g., regulatory requirements) pertaining to a deployment environment. To this end, the selector 176 may, in one embodiment, receive input from any one or more of the antenna interface 153, the sensor interface 168, the network interface 172, and/or the user interface 174, and select appropriate modulation schemes or formats based on any one, or a combination, of such inputs. A baseband modulation code module may be selected by the selector 176 responsive to a determination that the RFID reader 12 is operating in a low-density environment. Alternatively, should the selector 176, based on received inputs, determine that the RFID reader 12 is operating in a high-density and noisy RF environment, it may operatively select the subcarrier modulation code module to configure the controller 160 appropriately.

The selector 176 may also operate, based on the received inputs, to select various configuration parameters, also stored within the reader memory 162, for inclusion within commands (e.g., a query command) of a reader-to-tag transmission. The selection of one or more configuration parameters may be made based on input received via the sensor interface 168, indicating that the RFID reader 12 is operating in an environment that is subject to specific regulatory requirements (e.g., that the RFID reader 12 is operating in Europe, and accordingly the configuration parameters included within a query command issued from the RFID reader 12 should configure a population of RFID tags 14 to modulate a backscatter signal appropriately). Further, the controller 160 may execute an appropriate modulation code module so as to generate a demodulator clock signal 161, appropriate for demodulating a received backscatter signal that is modulated according to the selected modulation format and configuration parameters.

Finally, it should be noted that the various components of the RFID reader 12 discussed above may be accommodated within a common housing, or may alternatively be distributed across multiple devices. Further, the various components of the reader circuit 150 may, in alternative embodiments, be implemented on a single integrated circuit. For example, the reader memory 162 may of course be included in a reader integrated circuit that includes the controller 160. While the sensor 170 is shown to be accommodated within a common housing of the RFID reader 12 in FIG. 17, it will likewise be appreciated that the sensor 170 may be located and positioned externally, and coupled to the RFID reader 12.

Figure 18:
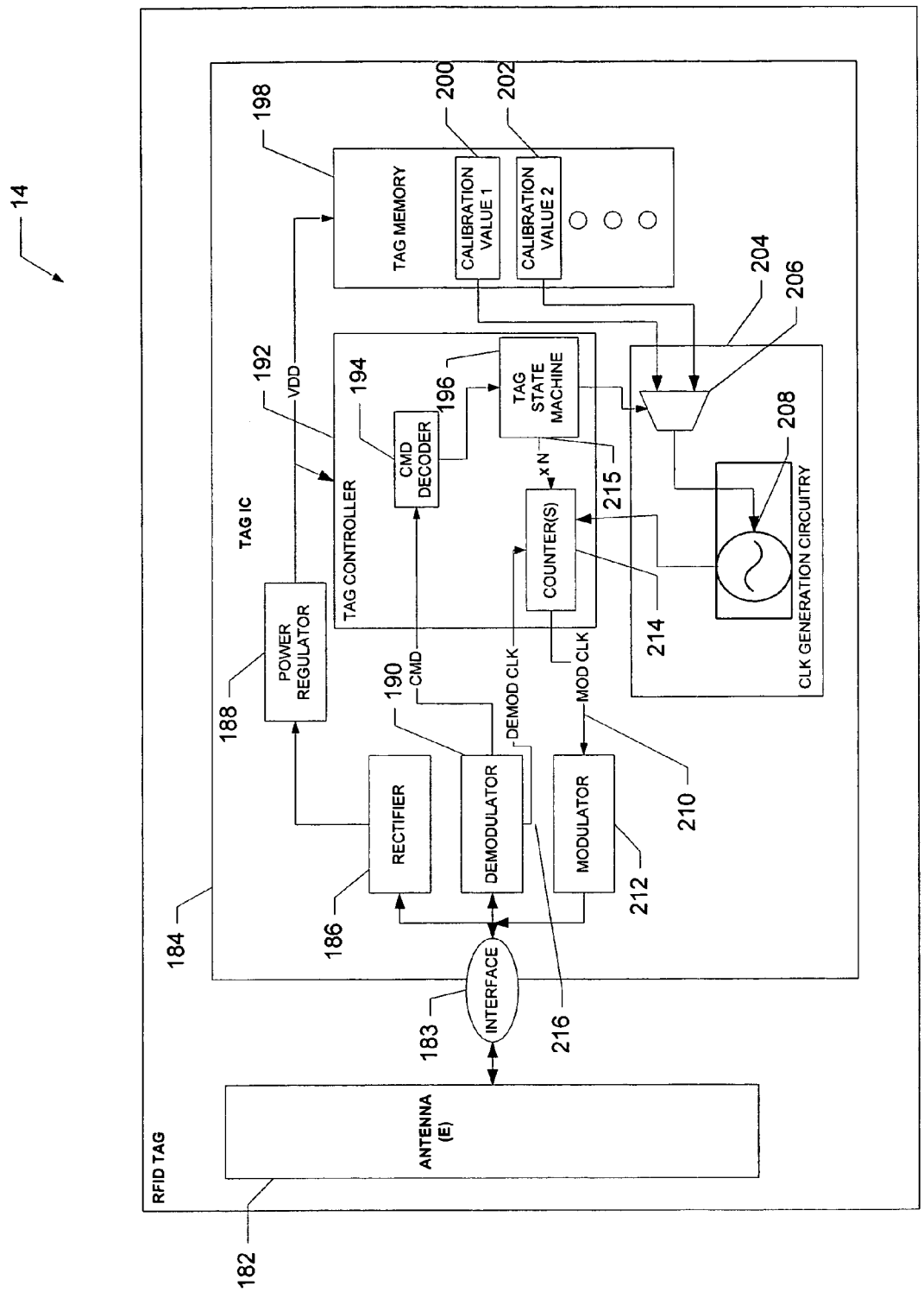
FIG. 18 is a block diagram providing architectural detail for an RFID tag, according to one exemplary embodiment.

FIG. 18 is a block diagram providing architectural detail for an RFID tag 14, according to one exemplary embodiment. The RFID tag 14 is shown to include one or more antennae 182, coupled to a tag integrated circuit 184 via an antenna interface 183 in the exemplary form of a pad. The tag interface 183 is in turn coupled to a rectifier 186, so as to enable an RF signal received via the antenna 182 to be propagated to the rectifier 186. The rectifier 186 extracts (or "scavenges") power from the received signal, the extracted power then being provided to a power regulator 188 that provides a voltage ($V_{DD}$) to various components of the tag integrated circuit 184. The antenna interface 183 is also coupled to a demodulator 190, so as to provide a received RF signal to the demodulator 190, which operationally demodulates the received signal to generate a command, and associated data values and configuration parameters. The demodulator 190 is shown to be coupled to a tag controller 192, and to provide commands, and the associated data and configuration parameters, to a command decoder 194. The command decoder 194 is coupled to a tag state machine 196, also included within the tag controller 192, and operationally decodes a command, responsive to which the command decoder 194 may instruct the tag state machine 196 to transition to a particular operational state.

The tag integrated circuit 184 also includes a tag memory 198, in which may be stored multiple calibration values 200, 202. The tag memory 198 is coupled to clock generation circuitry 204 that, in one embodiment, includes a multiplexer (MUX) 206 that operationally selects between the multiple calibration values 200, 202 stored within the tag memory 198 based on an output of the tag state machine 196. A state occupied by the tag state machine 196 may determine the output to the MUX 206, and accordingly may determine a calibration value selected by the MUX 206. In one embodiment, the calibration values 200 and 202 may configure the generation of the modulator clock signal 210 to modulate a backscatter signal utilizing subcarrier-based signaling at either a first backscatter frequency that provides an in-channel backscatter signal for a first bandwidth channel (e.g., a bandwidth channel in compliance with European regulations) or at a second backscatter frequency that a provides channel-boundary signal for a second bandwidth channel (e.g., a bandwidth channel in compliance with US regulations). In one embodiment, the data rates and frequencies specified by the calibration values allow a single signaling scheme to satisfy both North American and European regulatory requirements, while reducing the need for large spectral guardbands, and lowering tag clock frequency. For example, the data rates and frequencies specified by the calibration values may be such that the tag 14 can be calibrated, when operating under North American regulatory requirements, to use spectral separation to prevent reader/tag collisions. Under European regulatory requirements, the data rates and frequencies may be such as to enable synchronized readers to prevent reader/tag collisions.

In one exemplary embodiment, the calibration values 200 may be utilized to configure the RFID tag 14 for operation under North American regulatory requirements, and provide for tag-to-reader communications at 64 kilobits per second Miller, on a 256 kHz subcarrier. The clock generation circuitry 204 may generate a tag clock signal to clock the backscattered data.

The MUX 206 is shown coupled to oscillator 208 that may be calibrated in accordance with a selected calibration value and provides a frequency signal to one or more counters 214 implemented within the tag controller 192. While a MUX 206 is described above as performing the selection operation, the selection may simply be part of a memory operation and any one of a number of memory access schemes may be utilized to select an appropriate calibration value. The counters 214, utilizing the frequency signal, are responsible for the generation of one or more clock signals that are propagated to other components of the tag integrated circuit 184. For example, the counters 214 may generate a modulator clock signal 210 that provides input to a modulator 212, and a demodulator clock signal 216 that provides input to the demodulator 190. The tag state machine 196 is also coupled to the counters 214 to provide a rate signal 215 that determines a multiplication or divide rate (e.g., x1, x2 . . . , xN) to be applied by the counters 214 in the generation of the modulator clock signal 210. The modulator clock signal 210, it will be appreciated, may operate as a "switch" signal according to which the modulator 212 varies the impedance of an antenna 182 to thereby modulate a backscatter signal transmitted from the RFID tag 14. Accordingly, in one embodiment, the "tag clock frequency" (e.g., the modulator clock signal 210) may be a multiple of a subcarrier frequency. This enables a single RFID tag to support multiple subcarrier frequencies by selection (e.g., by the tag state machine 196) of a divide rate from one of a number of divide rates supported by the RFID tag. Referring specifically to the subcarrier signaling embodiment, subcarrier signaling may comprise 1 to N cycles/bit. For example, when deployed in an environment subject to European regulations, the modulator clock signal 210 may be a 64 kHz signal (e.g., 4 cycles/bit×16 kbps). Similarly when deployed in the an environment subject to North American regulations, the clock signal 210 may be a 256 kHz signal (e.g., 4 cycles/bit×64 kbps). Further, the subcarrier-based signaling may comprise N cycles per bit, where N is an integer greater than or equal to one. In another embodiment, the subcarrier-based signaling may comprise N half-cycles per bit, where N is an integer greater than or equal to one.

Figure 19:
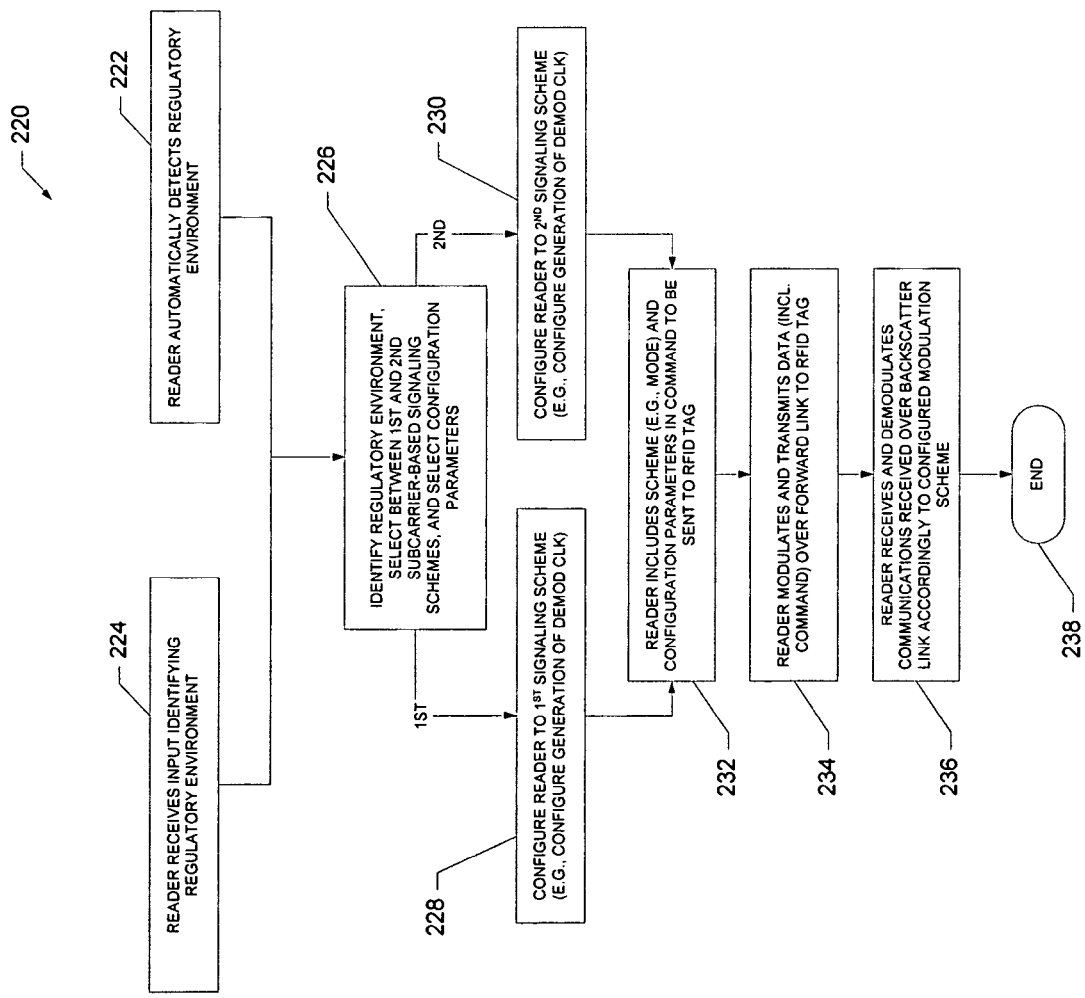
FIG. 19 is a flowchart illustrating an exemplary method to configure an RFID reader according to a regulatory requirement within a deployment environment.

FIG. 19 is a flowchart illustrating an exemplary method 220 to configure an RFID reader 12 to comply with regulatory requirements of a deployment environment.

The method 220 commences with the receipt of an input, at the RFID reader 12, indicative of a regulatory environment in which the RFID reader 12 is to be deployed. In one embodiment, the RFID reader 12 may, at block 222, automatically determine the regulatory environment. For example, the RFID reader 12 may automatically determine that it is operating on the North American continent, or in Europe, for example utilizing GPS information.

The RFID reader 12 may, at block 224, also or alternatively receive an input identifying a specific regulatory environment from an external source. For example, the RFID reader 12 may be coupled, via a network interface 172, to a network, and accordingly to one or more other computer systems or sensors, that may provide the input identifying a regulatory environment, or other information (e.g., a geographic location) that enables the RFID reader 14 to identify an applicable regulatory environment. Specifically, an external computer system may, for example, provide information identifying a specific geographic location in which the RFID reader 12 is operating, or specific regulatory restrictions that are applicable within the deployment environment.

The input received at block 224 could also be manual input received via the user interface 174 of the RFID reader 12. For example, a user may manually indicate that the reader is operating under any one of a number of regulatory environments, or at any one of a number of locations. Where the manual input identifies a location, the RFID reader 14 may, in one embodiment, store a table identifying regulatory requirements applicable at each of a number of locations at which the RFID reader 14 may be deployed.

The method 220 then progresses to block 226, where the reader controller 160, and specifically the selector 176, operates to identify an applicable regulatory environment and to select between multiple modulation schemes or formats to utilize for transmissions between the RFID reader 12 and the population of RFID tags 14, based on the identified environmental condition(s). For example, the RFID reader 12 may determine that it is operating under the North American regulatory requirements.

A selected non-baseband modulation format may be a subcarrier modulation format. The selection of the modulation format may include the consideration of any one or more of the inputs, received via one or more interfaces, of the RFID reader 12. In an exemplary embodiment, the selection performed at block 226 is between first and second subcarrier-based signaling schemes, each of which is suited for a specific regulatory environment. For example, the first subcarrier-based signaling scheme may provide for in-channel backscatter signaling in one of ten 200 kHz wide channels that are available under European regulations. The second subcarrier-based TDM signaling scheme may provide for channel-boundary (or edge) backscatter signaling with respect to one of fifty 500 kHz channels that are available under North American regulations.

At block 226, the selector 176, as mentioned above, may also select one or more configuration parameters according to which to configure RFID reader 12. For example, when operating within a North American environment, the configuration parameters may be selected such as to enable channel hopping, while a configuration parameter to disable this function may be selected if determined that the deployment environment is located in Europe. Similarly, if a determination is made at block 226 that the RFID reader 12 is operating within a European environment, a reader synchronization function of the RFID reader 12 may be enabled, whereas this feature may be disabled within a North American deployment environment.

Moving on from block 226, depending on whether a first or a second modulation format is selected at block 226, the method 220 progresses to block 228 or block 230. For the purposes of illustration only two modulation schemes (broadly identified as first and second modulation schemes have been described. It will be appreciated that any number of modulation schemes may be available for selection, and may in fact be selected, at block 226.

At block 228, the RFID reader 12 is configured according to the selected modulation scheme by the controller 160. Where, for example, the modulation format is a subcarrier-based signaling scheme, the controller 160 may retrieve the modulation code from the associated reader memory 162 (or may retrieve appropriate configuration values from the memory 162) to configure the RFID reader 12. The configuration of the RFID reader 12 according to the subcarrier modulation scheme may involve selection of an appropriate counter (or counter algorithm) 167 to generate the demodulator clock 161 for demodulation of a backscatter signal modulated according to the selected modulation scheme.

Figure 21:
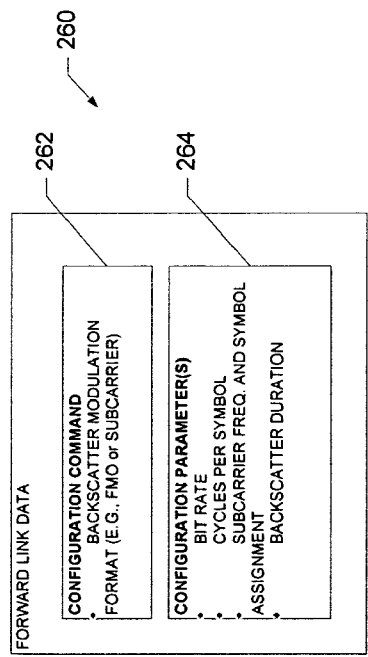
FIG. 21 is a diagrammatic representation of forward-link data that may be generated at an RFID reader.

At block 232, the RFID reader 12 includes modulation scheme (e.g., modulation mode) information, and appropriate configuration parameters in a command to be transmitted to a population of RFID tags 14. FIG. 21 is a diagrammatic representation of forward-link data 260 that may be generated at the RFID reader 12 at block 232. Specifically, the forward-link data 260 may include a configuration command 262 specifying a backscatter modulation scheme or format (e.g., an FMØ or a subcarrier backscatter modulation format), as well as any one of a number of configuration parameters 264 (e.g., a bit rate, cycles per symbol, subcarrier frequency and symbol assignment or backscatter duration).

Figure 22:
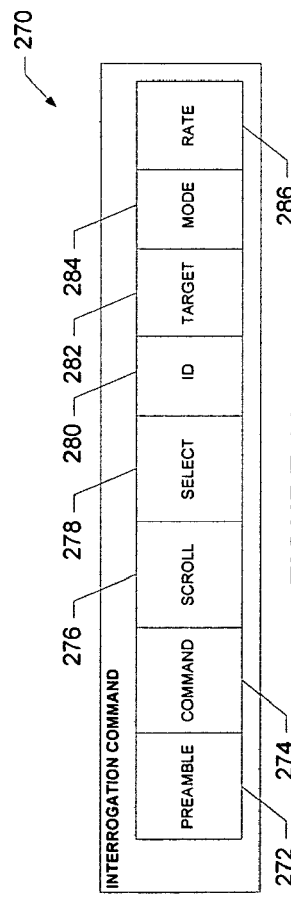
FIG. 22 is a block diagram providing further details regarding the structure and format of an exemplary configuration command, in the form of an interrogation command, which may be issued from an RFID reader to a population of RFID tags.

FIG. 22 is a block diagram providing further details regarding the structure of an exemplary configuration command, in the form of an interrogation command 270. As illustrated, the interrogation command 270 may include a preamble 272; a command 274 (e.g., a query command); a scroll specifier 276, which sets an acknowledgement mode for the RFID tags; a select specifier 278 that may specify a tag population to respond to the command (e.g., the query command); an identifier 280 and a tag specifier 282 that further specify a tag population that is required to respond to the command; a mode specifier 284 that sets a backscatter mode (e.g., FMØ or subcarrier); and a rate specifier 286 that specifies a rate at which a tag should backscatter (e.g., x1, x2, x4, etc.).

Returning to the method 220 as illustrated in FIG. 19, at block 234, the RFID reader 12 then modulates and transmits the forward-link data 260 over the forward-link to the population of RFID tags 14.

At block 236, the RFID reader 12 receives and demodulates communications (e.g., reply data) received over the backscatter link, the received data being modulated according to the selected backscatter scheme specified in the forward-link data. As noted above, the RFID reader 12 may be configured by the controller 160 to demodulate the received data by the generation of an appropriate demodulator clock signal 161.

Figure 23:
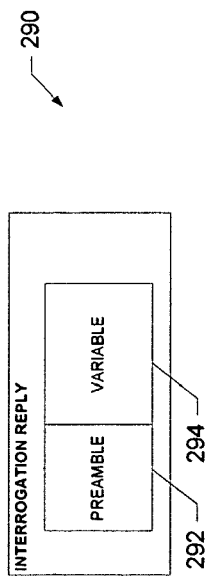
FIG. 23 is a block diagram illustrating the structure and format of an exemplary interrogation reply that may be received by an RFID reader from an RFID tag.

FIG. 23 is a block diagram illustrating an example of an interrogation reply 290 that may be received by the RFID reader 12 at block 236. The interrogation reply 290 is shown to include a preamble 292 and a variable 294 that may include identifier information stored by a responding RFID tag 14. The method 220 then terminates at block 238.

Figure 20:
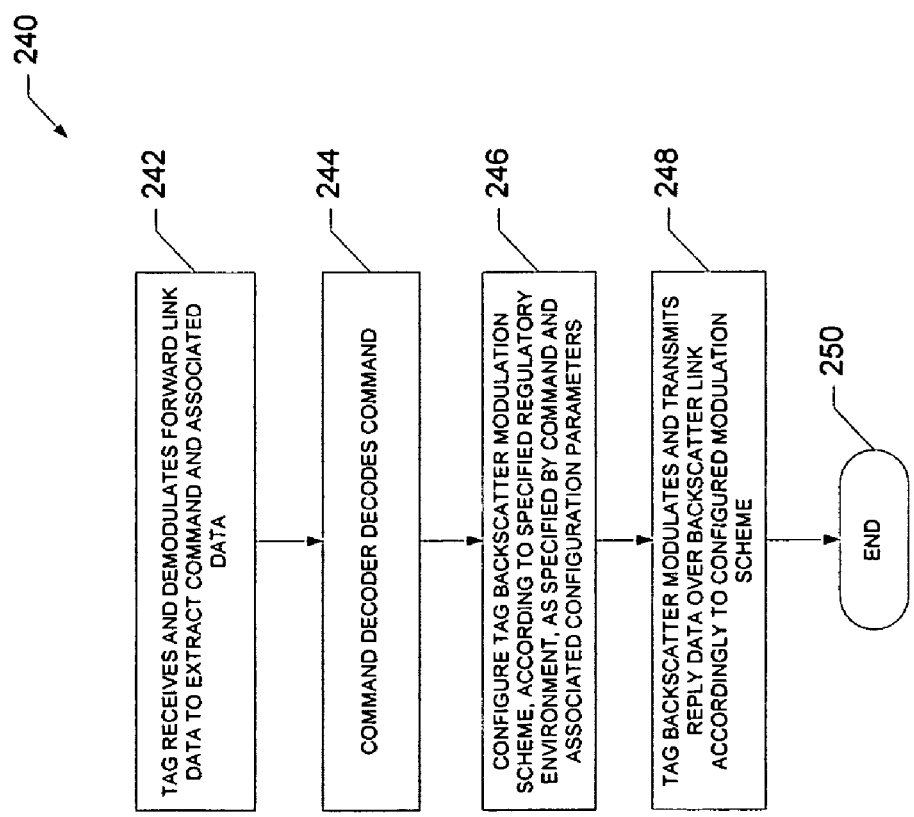
FIG. 20 is a flowchart illustrating a method, according to an exemplary embodiment, to configure an RFID integrated circuit according to any one or more of a number of regulatory requirements.

FIG. 20 is a flowchart illustrating a method 240, according to one embodiment, to configure an RFID integrated circuit, such as the tag integrated circuit 184 discussed above with reference to FIG. 18, according to any one or more of a number of regulatory environments.

At block 242, an RFID tag 14 (of which the tag integrated circuit 184 is a component) receives and demodulates forward-link data 260 to extract a configuration command 262, and associated configuration parameters 264. In an embodiment where the RFID tag 14 is a "passive" tag, the tag 14 receives all operating energy from the radio-frequency signal that carries the forward-link data. Accordingly at block 242, the rectifier 186 may, as described above with reference to FIG. 18, extract operating energy from the received signal. At block 244, the demodulator 190, having extracted the command 262 and configuration parameters 264, communicates this data to the command decoder 194 of the tag controller 192, the command decoder 194 then decoding the relevant command.

At block 246, the tag controller 192, and specifically the tag state machine 196, configures a tag backscatter modulation scheme in accordance with the configuration command 262 and the configuration parameters 264. For example, where the mode specifier 284 included within an interrogation command 270 specifies subcarrier-based signaling, and a rate specifier 286 specifies a specific rate, an appropriate calibration value may be selected from the tag memory 198, and an appropriate counter 214 set to generate a demodulator clock signal 216. For example, a rate signal 215 may be generated to configure the counter 214 to modulate at a specific (e.g., x1, x2, . . . xN) rate.

At block 248, the RFID tag 14 then modulates a backscatter signal in accordance with the configuration, (e.g., by modulating the impedance of the antenna 182) and transmits reply data (e.g., an interrogation reply 290) over the backscatter link to the interrogating RFID reader 12. The method 240 then terminates at block 250.

In the exemplary embodiment, an RFID system is described that operates in the 860 MHz-960 MHz frequency range (i.e., is an Ultra-High Frequency (UHF) system). In the exemplary embodiment, an RFID system is further described in which an RFID reader (or interrogator) communicates with and powers a population of passive RFID tags that are illuminated by a radio-frequency signal transmitted from one or more RFID readers. Reader/tag communications may be half-duplex (i.e., either the RFID reader talks and the RFID tags listen, or vice versa). In one embodiment, during the reader-to-tag communications, RFID readers communicate information to tags utilizing Amplitude Shift Key (ASK) modulation of a radio-frequency signal transmitted from the RFID reader. Passive RFID tags extract all operating energy from a received radio-frequency signal. During the tag-to-reader communications, the RFID reader transmits a Continuous Wave (CW) radio-frequency signal to the population of RFID tags. One or more of the RFID tags within the illuminated population communicates information back to the RFID reader by modulating the impedance (or reflection coefficient) of an associated antenna. The RFID reader observes communications from the RFID tag as amplitude- or phase-modulated backscatter of the CW signal.

Table 1 below provides exemplary rate/format, and tag clock frequency, configurations according to which RFID tags, operating under North American and European regulatory restrictions respectively, may be programmed in the matter described herein:

TABLE 1

| Region | Link | Rates/Format | Tag Clock |
| --- | --- | --- | --- |
| North America | Reader-to-Tag | 40 kbps | 1280 kHz |
| North America | Tag-to-Reader | 64 kbps on 256 kHz subcarrier | 1280 kHz |
| Europe | Reader-To-Tag | 40 kbps | 320 kHz |
| Europe | Tag-to-Reader | 16 kbps Miller on 64 kHz subcarrier | 320 kHz |

Figure 24:
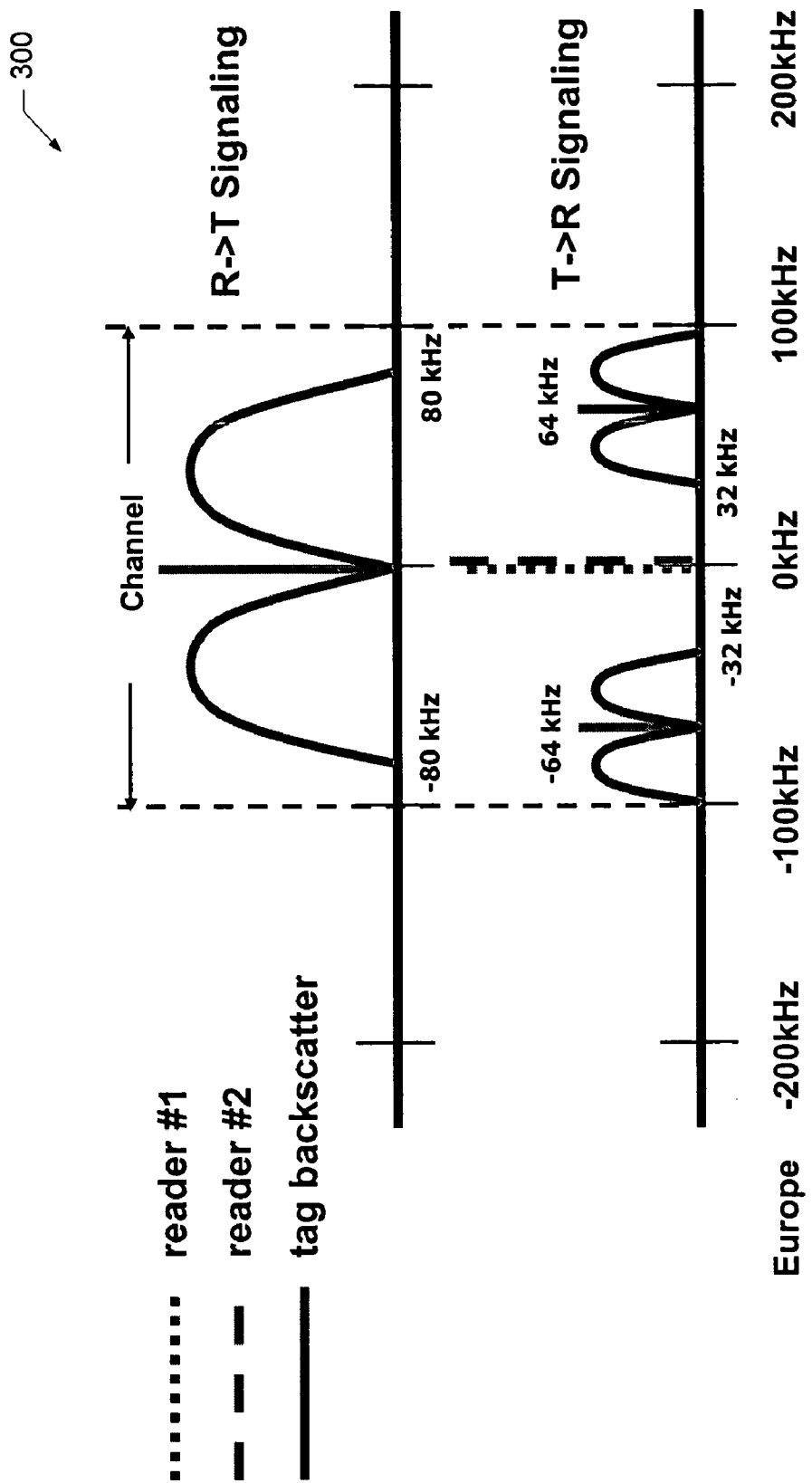
FIG. 24 is a frequency diagram showing frequency spreads for both reader-to-tag signaling, and tag-to-reader signaling, as may be achieved utilizing an embodiment of the present invention, under European regulations and utilizing subcarrier-based signaling.

FIG. 24 is a frequency diagram 300 showing frequency spreads for both reader-to-tag signaling, and tag-to-reader signaling, as may be achieved utilizing an embodiment of the present invention, under European regulations and utilizing subcarrier-based signaling. As noted above, under European regulations reader synchronization is permissible. Accordingly, for the reader-to-tag signaling, both the first and second readers transmit signals at the same time within a 200 kHz channel. The first and second readers also shown to transmit Continuous Wave (CW) signals at the same time. The tag-to-reader signaling is shown to comprise in-channel backscatter signals. While the frequency diagram 30 shows a spectrum for a double-sideband reader, it will be appreciated that single-sideband, and other spectra, are also possible.

Figure 25:
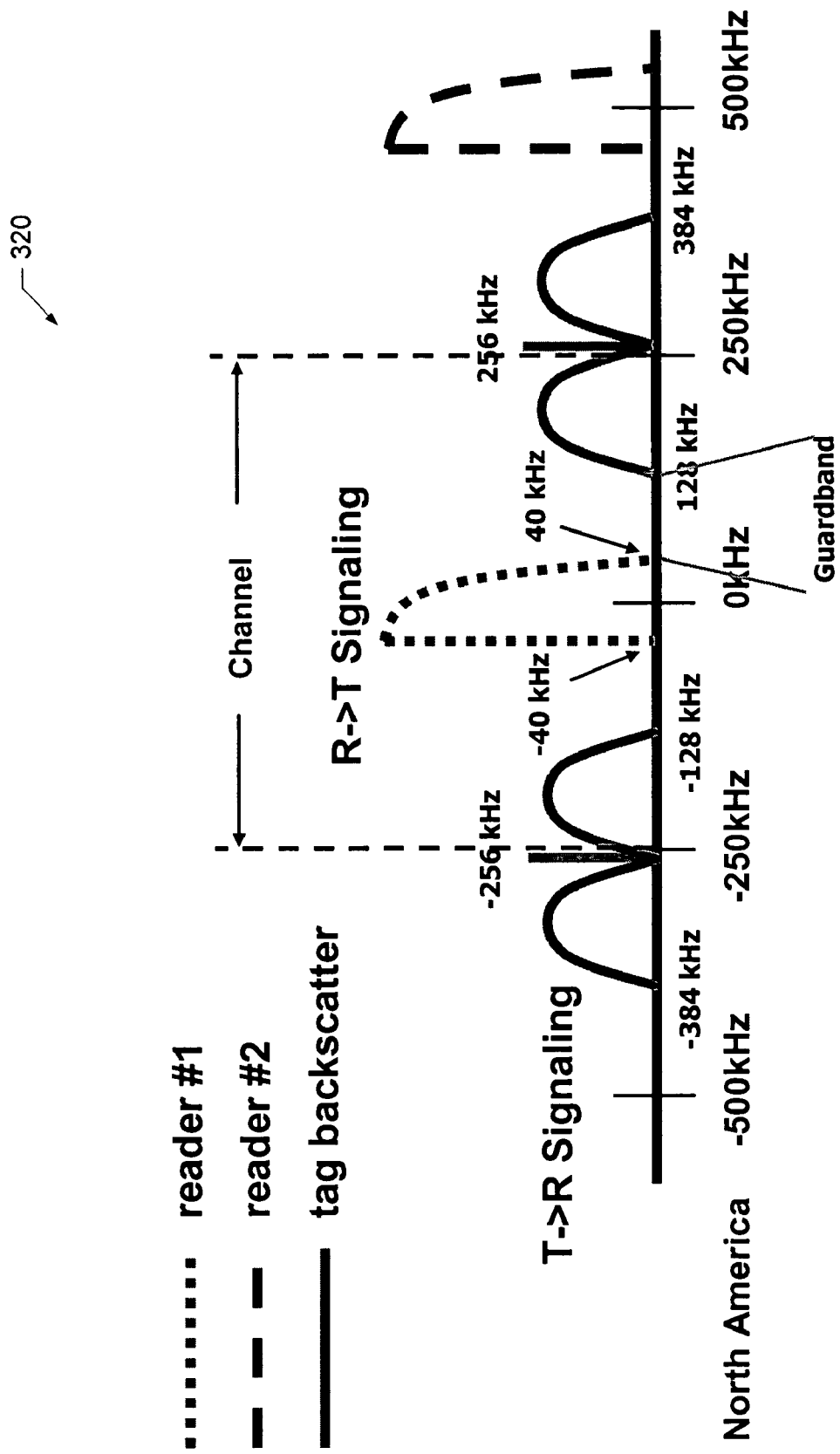
FIG. 25 is a frequency diagram showing frequency spreads for reader-to-tag signaling, and tag-to-reader signaling as may be achieved utilizing an embodiment of the present invention, under the North American regulations and utilizing subcarrier-based signaling.

FIG. 25 is a frequency diagram 320 showing frequency spreads for reader-to-tag signaling, and tag-to-reader signaling, as may be achieved utilizing an embodiment of the present invention, under the North American regulations and utilizing subcarrier-based signaling. First and second readers are not synchronized, and tag backscatter is located at or near channel boundaries (or edges) of a 500 kHz channel. By this spectral plan, there is no overlap between reader signals and tag backscatter. Furthermore, it will be noted that a 88 kHz guardband is achieved between the reader-to-tag signal generated by the first reader and the tag backscatter.

Figure 26:
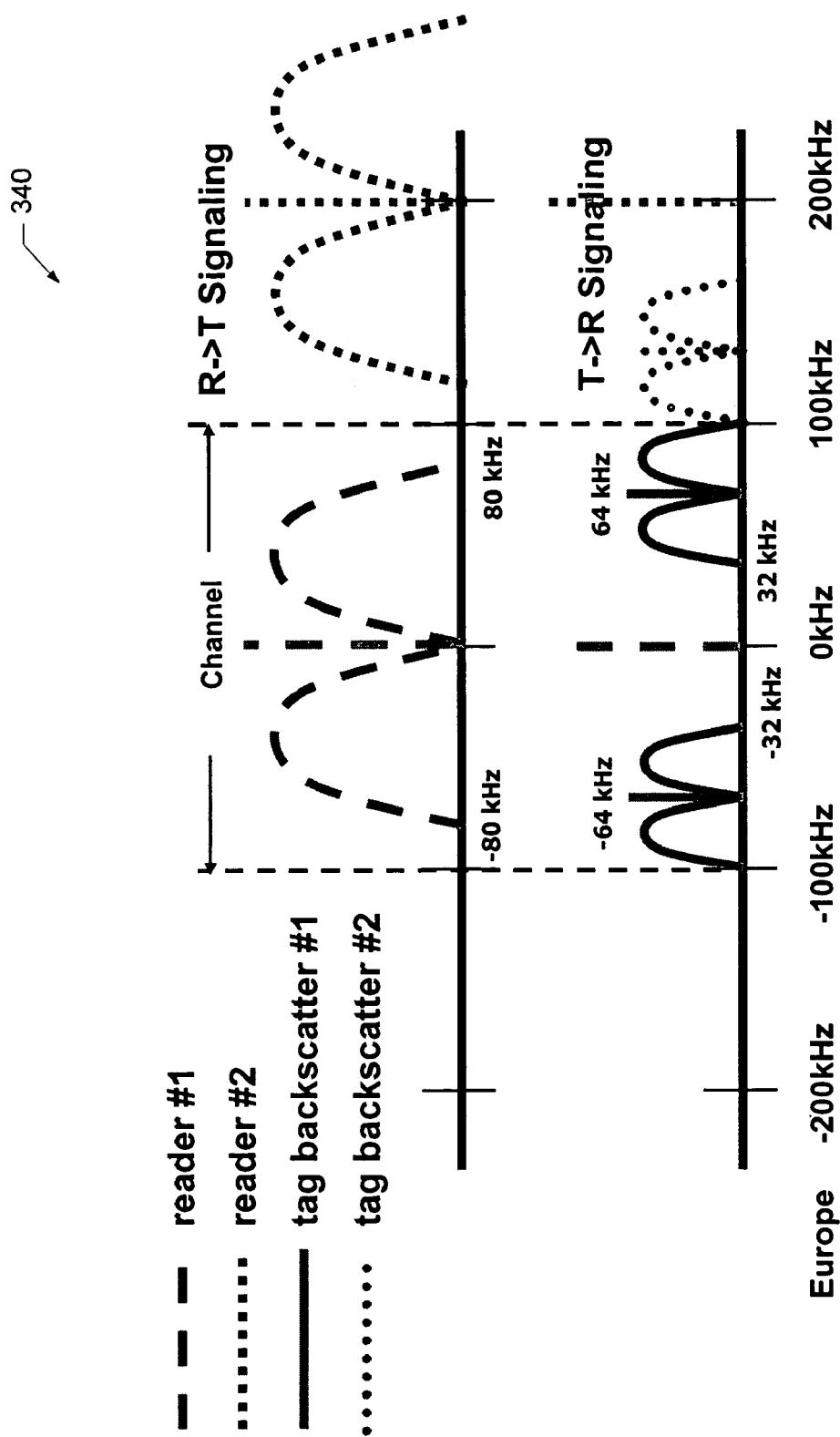
FIG. 26 is a frequency diagram illustrating frequency spreads for co-located first and second readers under European regulations, as may be achieved utilizing one embodiment of the present invention.

FIG. 26 is a frequency diagram 340 illustrating frequency spreads for co-located first and second readers under European regulations, as may be achieved utilizing one embodiment of the present invention. As noted for the reader-to-tag signaling, this signaling is synchronized and allocated to adjacent 200 kHz channels. As the reader-to-tag signaling is achieved using in-channel backscatter, collisions in the both reader-to-tag signaling and tag-to-reader signaling are avoided.

Figure 27:
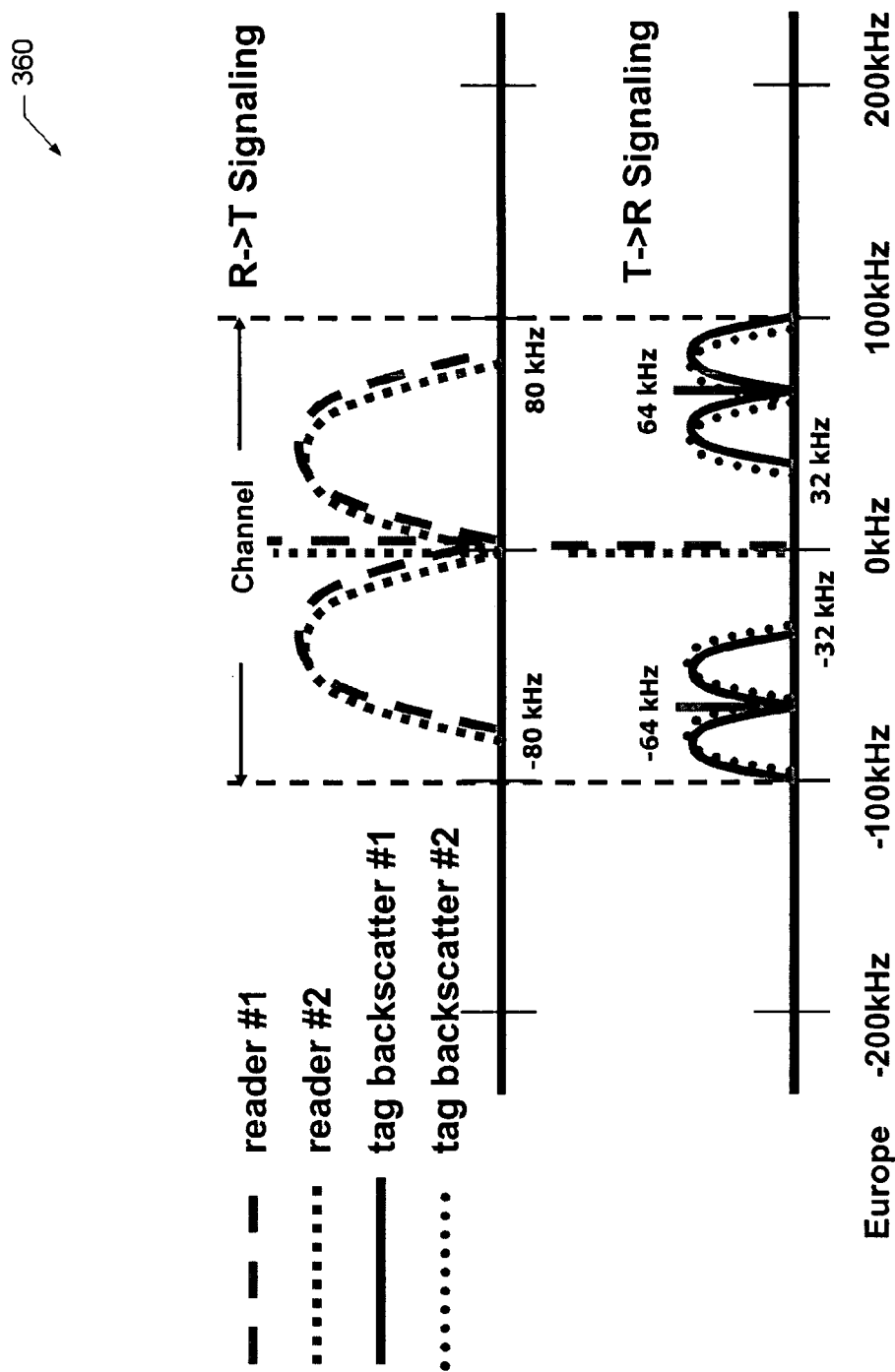
FIG. 27 is a frequency diagram illustrating frequency spreads for co-channel first and second readers under European regulations, as may be achieved utilizing one embodiment of the present invention.

FIG. 27 is a frequency diagram 360 illustrating frequency spreads for co-channel first and second readers under European regulations, as may be achieved utilizing one embodiment of the present invention. Reader signals are shown to collide with other reader signals, but not with tag signals, with path losses minimizing the impact of reader-reader collisions. Similarly, tag signals collide with other tag signals, but not with reader signals, with path losses minimizing the impact of tag-tag collisions. As is apparent, additional readers and tags can occupy channels adjacent to the one used in FIG. 27.

Figure 28:
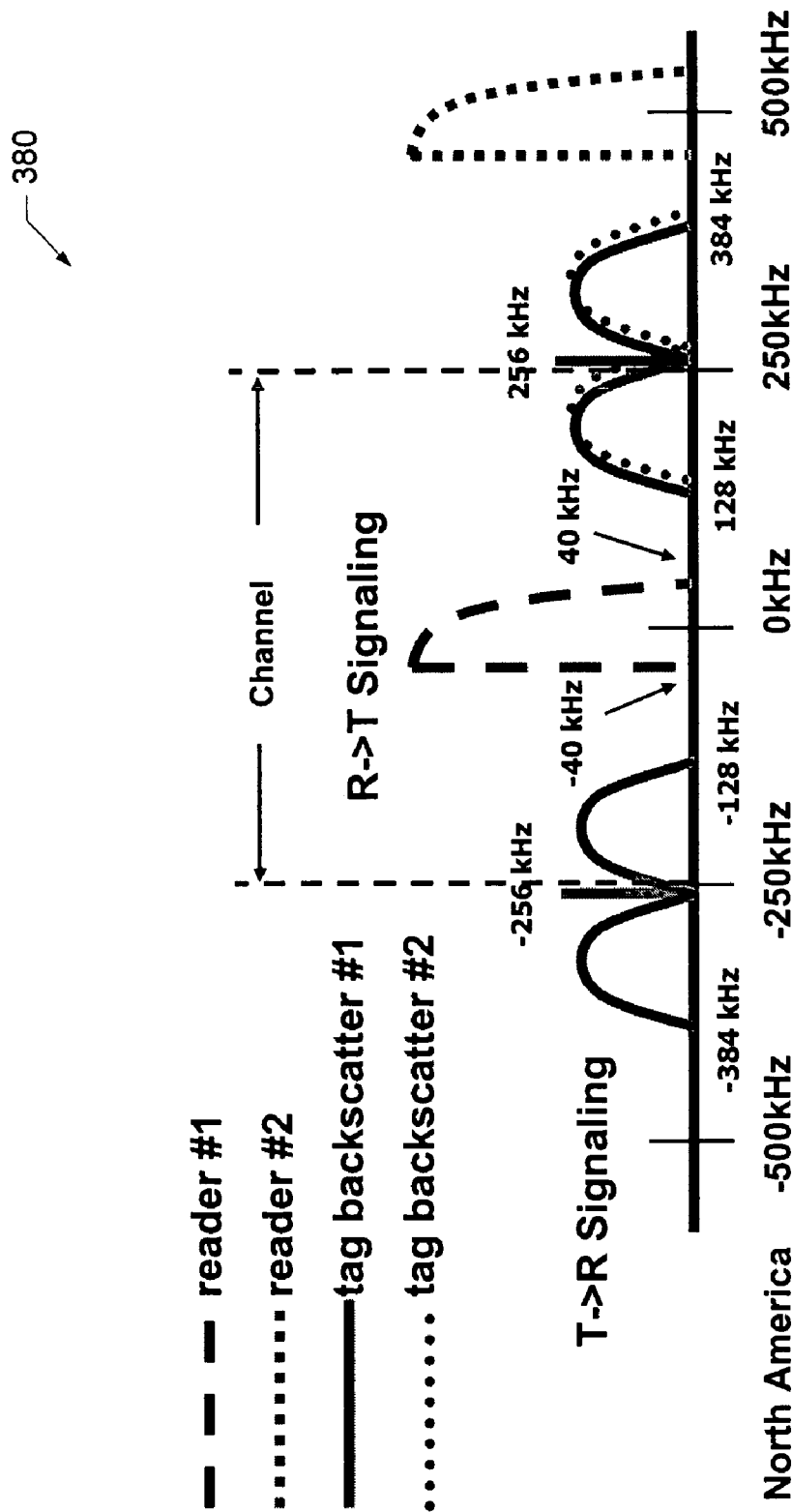
FIG. 28 is a frequency diagram illustrating frequency spreads for co-located first and second readers under North American regulations, as may be achieved utilizing an exemplary embodiment of the present invention.

FIG. 28 is a frequency diagram 380 illustrating frequency spread for co-located first and second readers under North American regulations, as may be achieved utilizing an exemplary embodiment of the present invention. As shown, tag signals collide with other tag signals, but not with reader signals, with path losses minimizing the impact of tag-tag collisions.

Figure 29:
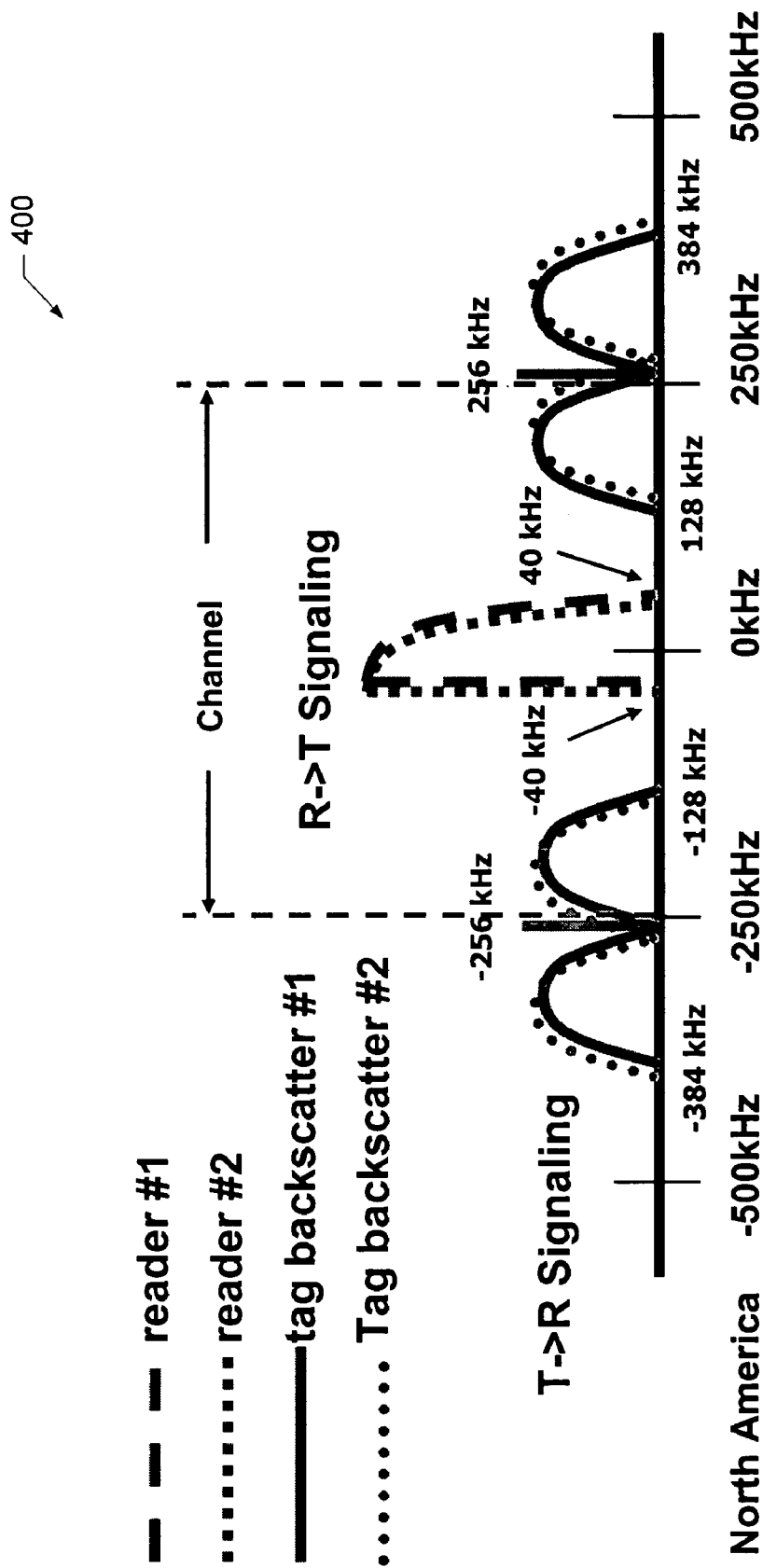
FIG. 29 is a frequency diagram illustrating frequency spread for co-channel first and second readers under North American regulations, as may be achieved utilizing an exemplary embodiment of the present invention.

FIG. 29 is a frequency diagram 400 illustrating frequency spreads for co-channel first and second readers under North American regulations, as may be achieved utilizing an exemplary embodiment of the present invention. Again, reader signals collide with reader signals, but not with tag signals, with path losses minimizing the impact of reader-reader collisions. Similarly, tag signals collide with tag signals, but not with reader signals, with path losses minimizing the impact of tag-tag collisions. As is apparent, additional readers and tags can occupy channels adjacent to the one used in FIG. 29.

Figure 30:
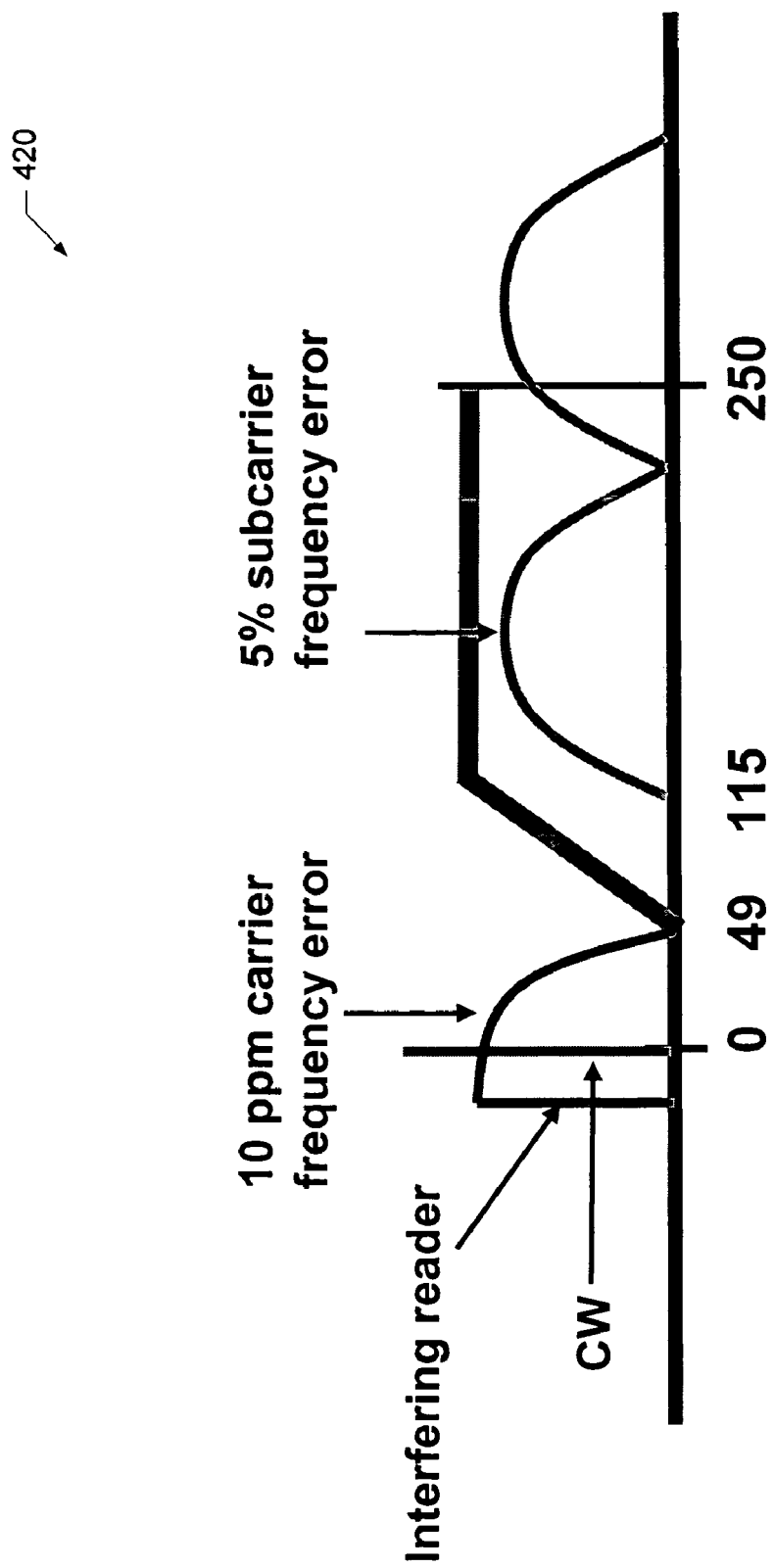
FIG. 30 is a frequency diagram illustrating guardband sizing under North American regulations, according to an exemplary embodiment of the present invention.

FIG. 30 is a frequency diagram 420 illustrating guardband sizing under North American regulations, according to an exemplary embodiment of the present invention. Specifically, the frequency diagram 420 illustrates a 250 kHz channel. The 40 kHz of spectrum is utilized by an interfering reader. A 10 ppm frequency error results in a 49 kHz upper band edge for the interfering reader. The 128 kHz-384 kHz spectrum is utilized for backscatter signaling, assuming a 250 kHz subcarrier. Further, assuming a 5% subcarrier frequency error, a lower band edge of 115 kHz may be assumed for backscatter signaling. This results in a 66.2 kHz guardband (i.e., 115.2 kHz 49 kHz).

It should also be noted that embodiments of the present invention may be implemented and not only as a physical circuit or module (e.g., on a semiconductor chip) but, also within a machine-readable media. For example, the algorithms, circuits and designs described above may be stored upon, or embedded within, a machine-readable media associated with a design tool used for designing semiconductor devices. Examples include a netlist formatted in the VHSIC Hardware Description Language (VHDL), the Verilog language, or the SPICE language. Some netlist examples include a behavioral level netlist, a register transfer level, (RTL) netlist, a gate level netlist, and a transistor level netlist. Machine-readable media include media having layout information, such as a GDS-II file. Furthermore, netlist files and other machine-readable media for semiconductor chip design may be used in a simulation environment to perform any one or more methods described above. Thus it is also to be understood that embodiments of the present invention may be used, or to support, a software program executing on some processing core (e.g., a CPU of a computer system), or otherwise implemented or realized within a machine-readable medium. A machine-readable medium may include any mechanism for storing and transmitting information in a form readable by a machine (e.g., a computer). For example, a machine readable-readable medium may comprise a read-only memory (ROM), a random access memory (RAM), magnetic disc storage media, optical storage media, flash memory devices, electrical, optical, acoustic, or other form of propagated signal (e.g., a carrier wave, infrared signal, radio-frequency signal, a digital signal, etc.).

One embodiment also extends to a machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be an RFID reader, an RFID tag, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. The term "machine" shall also be taken to include any collection of machines that individually or jointly execute a set (or multiple sets) of instructions to perform any one or more of the methodologies discussed herein.

The machine may further include machine-readable medium on which is stored one or more sets of instructions and data structures (e.g., software) embodying or utilized by any one or more of the methodologies or functions described herein. The software may also reside, completely or at least partially, within a memory and/or within the processor during execution thereof by the machine, the main memory 19 and the processor also constituting examples of machine-readable media.

The software may further be transmitted or received over a network via a network interface device utilizing any one of a number of well-known transfer protocols.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and an apparatus to configure an RFID system to be adaptable to a plurality of environmental conditions have been described. Although the present invention had been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An RFID reader for communicating with RFID tags, comprising:
    an interface receiving an input indicative of a present geography that is subject to an associated regulatory environment;
    a lookup table storing a plurality of operating parameters for a corresponding plurality of geographies for determining, based on the input, an operating parameter suitable for the regulatory environment of the present geography; and
    a controller transmitting a first configuration signal that configures the RFID tags to backscatter responses to the reader according to the operating parameter.

2. The RFID reader of claim 1, wherein
the operating parameter is one of at least one a bit rate, cycles per symbol, subcarrier frequency, symbol assignment, and backscatter duration.

3. The RFID reader of claim 1, wherein:
the controller is adapted to transmit a carrier frequency and a second configuration signal, and
the second configuration signal commands the tag to respond by backscattering data at one of the carrier frequencies off the carrier frequency.

4. The RFID reader of claim 1, wherein
the interface is a user interface, and
the input is received manually by a user.

5. The RFID reader of claim 1, wherein
the interface is a computer system, and
the input is received by an operator of the computer system.

6. The RFID reader of claim 1, wherein
the interface is a network interface to a computer system, and
the input is received via a network from the computer system.

7. The RFID reader of claim 1, wherein
the input is a signal received from another RFID reader.

8. The RFID reader of claim 1, wherein
the interface is a global positioning system (GPS) interface, and
the input is a signal identifying a geographic location at which the REID reader is operating.

* * * * *

UNITED STATES PATENT AND TRADEMARK OFFICE
CERTIFICATE OF CORRECTION

| | |
|---|---|
| PATENT NO. | : 7,283,037 B2 |
| APPLICATION NO. | : 10/985518 |
| DATED | : October 16, 2007 |
| INVENTOR(S) | : Diorio et al. |

It is certified that error appears in the above-identified patent and that said Letters Patent is hereby corrected as shown below:

In column 7, line 15, before "a computer" delete "an".

In column 22, line 13, delete "had" and insert -- has --, therefor.

In column 22, line 61, in Claim 8, delete "REID" and insert -- RFID --, therefor.

Signed and Sealed this

Twenty-fifth Day of December, 2007

JON W. DUDAS
*Director of the United States Patent and Trademark Office*